(12) United States Patent
Zdroik

(10) Patent No.: US 10,188,088 B2
(45) Date of Patent: Jan. 29, 2019

(54) FISH STRIKE INDICATING APPARATUS, SYSTEM AND METHOD FOR USE WITH AN ICE FISHING TIP-UP

(71) Applicant: Deep Freeze, LLC, Eagle River, WI (US)

(72) Inventor: Bradley James Zdroik, Eagle River, WI (US)

(73) Assignee: Deep Freeze, LLC, Stevens Point, WI (US)

( * ) Notice: Subject to any disclaimer, the term of this patent is extended or adjusted under 35 U.S.C. 154(b) by 865 days.

(21) Appl. No.: 14/550,995

(22) Filed: Nov. 22, 2014

(65) Prior Publication Data

US 2015/0143736 A1 May 28, 2015

Related U.S. Application Data

(60) Provisional application No. 61/907,985, filed on Nov. 22, 2013.

(51) Int. Cl.
*A01K 85/01* (2006.01)
*A01K 97/01* (2006.01)
*A01K 97/12* (2006.01)
*A01K 97/00* (2006.01)

(52) U.S. Cl.
CPC .............. *A01K 97/01* (2013.01); *A01K 97/00* (2013.01); *A01K 97/125* (2013.01)

(58) Field of Classification Search
CPC ........ A01K 97/00; A01K 97/01; A01K 97/12; A01K 97/125

USPC .............................................................. 43/17
See application file for complete search history.

(56) References Cited

U.S. PATENT DOCUMENTS

| | | | | |
|---|---|---|---|---|
| 4,928,419 A * | 5/1990 | Forrestal | ................ | A01K 97/01 43/17 |
| 5,097,618 A * | 3/1992 | Stoffel | .................. | A01K 97/01 43/17 |
| 5,782,033 A * | 7/1998 | Park | ..................... | A01K 97/125 43/17 |
| 5,979,101 A * | 11/1999 | Muenchow | ............ | A01K 97/01 43/17 |
| 6,464,373 B1 * | 10/2002 | Petrick | ................... | F21V 11/14 257/E25.028 |
| 7,008,086 B1 * | 3/2006 | Kell | ....................... | A01K 97/01 362/191 |
| D547,891 S * | 7/2007 | Shiu | ............................ | D26/40 |
| 7,562,488 B1 * | 7/2009 | Perkins | ................ | A01K 87/007 43/17 |
| 7,613,425 B2 * | 11/2009 | Tailor | .................... | H04W 88/04 370/328 |
| 8,497,778 B1 * | 7/2013 | Martin | .................. | A01K 97/01 242/223 |
| D700,381 S * | 2/2014 | Pamani | .......................... | D26/40 |
| 8,896,450 B1 * | 11/2014 | Overbye | ............. | A01K 97/125 340/573.1 |
| 9,217,547 B2 * | 12/2015 | Sharrah | ................... | F21L 4/005 |

(Continued)

*Primary Examiner* — Richard G Davis
(74) *Attorney, Agent, or Firm* — Husch Blackwell LLP

(57) ABSTRACT

An apparatus, system and method for providing an indication or notification to a fishermen when a fish strikes an ice fishing tip-up is disclosed. The apparatus provides a wireless signal indicative of a fish strike. The system and method include and utilize an application operatively running on a mobile device and configured to receive the fish strike indicating signal.

23 Claims, 39 Drawing Sheets

(56) References Cited

U.S. PATENT DOCUMENTS

| 9,702,525 B1* | 7/2017 | Roudeski | F21V 13/04 |
| 2014/0090287 A1* | 4/2014 | Olson | A01K 97/01 |
| | | | 43/17 |
| 2015/0113853 A1* | 4/2015 | McKeough | A01K 93/02 |
| | | | 43/17 |

* cited by examiner

FISH STRIKE INDICATING APPARATUS, SYSTEM AND METHOD FOR USE WITH AN ICE FISHING TIP-UP

CROSS-REFERENCE TO RELATED APPLICATIONS

This application claims priority to U.S. Provisional Patent Application Ser. No. 61/907,985, filed Nov. 22, 2013, entitled Fish Strike Indicating System and Apparatus for Use with an Ice Fishing Tip-Up, the entire contents of which is hereby incorporated by reference in its entirety.

FIELD OF THE INVENTION

The present invention relates generally to an apparatus and system for use in fishing. More specifically, it relates to an apparatus, system and method for providing an indication or notification to a fishermen when a fish strikes an ice fishing tip-up.

BACKGROUND OF THE INVENTION

Ice fishing is a very popular sport. Typically, ice fishing involves venturing out onto the frozen surface of a lake or river. A hole is typically drilled through the ice to access the water beneath the ice. A fishing line with a baited hook or lure attached to one end is then dropped through the hole in the ice in an attempt to catch fish that are living and swimming below the frozen surface.

Many different types of devices are used to catch fish during the ice fishing season. These devices include fishing poles or jigs and tip-up devices. Shown in FIGS. 1 and 2 is a typical prior art ice fishing tip-up device 100. Tip-up device 100 includes a base member 102, a flag pole assembly 104 and a swinging arm and spool assembly 106. Base member 102 is designed to sit on the ice over the opening or hole in the ice and includes a pair of longitudinal leg members 108, 110 and a pair of end cross members 112, 114 connecting the ends of leg members 108, 110 to each other. A central opening 116 is disposed in the center of base member 102 between leg members 108, 110 and end cross members 112, 114. Protruding upward from cross member 112 at one end of base member 102 is a flag pole assembly mounting member 118 which in this case is a cylindrical shaped stud or spindle member.

Flag pole assembly 104 includes a cylindrical flagpole 120, a colored flag 122 mounted on one end of flagpole 120, and a resilient mounting member such as, for example, a spring 124, mounted on the opposite end of flag pole 120. Spring 124 is disposed to slidably engage with flag pole assembly mounting member 118 to movably secure flag pole assembly 104 to base member 102 in the prior art tip-up shown in FIGS. 1 and 2.

Arm and spool assembly 106 includes a swinging arm or rod 126, a cylindrical swivel mounting member 128, a reel or spool 130 and a t-shaped flagpole engaging finger or member 132. Swinging rod 126 is perpendicularly disposed through an opening 134 in swivel mounting member 128 and is secured to swivel mounting member 128 at a desired position using, for example, a set screw 144 (see FIGS. 20 and 21). The ends of swivel mounting member 128 are in turn rotatably secured to base member 102 by being disposed in complementary cylindrical openings 136, 138 in each of leg members 108, 110 respectively. In this way, arm and spool assembly 106 can swing from a horizontal position, the desired position during storage of tip-up 100, downward through central opening 116 to a vertical position, the desired position when tip-up device 100 is in use.

Mounted on the lower end (when swinging rod 126 is in the vertical position) of swinging arm 126 is spool 130. A length of fishing line 140 is wound around spool 130 with one end of the line attached to spool 130. A fish hook 142 is attached to the other end of fishing line 140 for use in catching fish. Mounted to the opposite end of swinging rod 126 is flagpole engaging member 132. Flagpole engaging member 132 is disposed on this end of rod 126 to engage with flagpole 120 when flagpole assembly 104 is in the horizontal or substantially horizontal "non-strike" indicating position (see FIG. 1). The "non-strike" indicating position is the position of flag pole assembly 104 prior to the occurrence of a fish strike.

The operation of prior art tip-up device 100 will now be described. During normal set-up, tip-up device 100 is disposed over the opening or hole in the ice with arm and spool assembly 106 disposed in a vertical position. In this position, rod 126 extends downward through central opening 116 in base member 102 and downward through the hole in the ice. In this position, spool 130, which is fixedly mounted to the lower end of rod 126, is disposed in the water below the ice surface with fishing line 140 and baited hook 142 attached thereto and in a position to receive a fish strike.

Flag pole assembly 104, meanwhile, is disposed in the horizontal or substantially horizontal "non-strike" indicating position above central opening 116 and is held in this position against the tension of spring 124 by engagement of flagpole 120 with flagpole engaging member 132 as is shown in FIG. 1. Tip-up device 100 is now set-up and ready to receive a fish strike.

In use, a fish, striking baited hook 142, causes fishing line 140 to unwind from spool 130. The unwinding of fishing line 140 from spool 130 causes spool 130 and attached swinging rod 126 to rotate. The rotation of rod 126 causes flagpole engaging member 132 to also rotate which in turn causes flagpole engaging member 132 to disengage from flagpole 120. Flagpole 120, which is under tension from spring 124, is now free to swing from its horizontal or substantially horizontal non-strike indicating position to a vertical "strike" indicating position (see FIG. 2).

It should be noted that because of the spring tension being applied to flagpole 120 by spring 124 when flagpole engaging member 132 first disengages from flagpole 120, flagpole assembly 104 actually "wiggles" back and forth on either side of the vertical strike indicating position before eventually settling down into its final steady-state vertical strike indicating position. In the vertical strike indicating position, colored flag 122 is visible to the fisherman and provides a manual indication and notification to a fisherman viewing the tip-up that a fish strike has occurred.

Prior art tip-ups of the type described above and shown in FIGS. 1 and 2 suffer from a major drawback however. In order for a fisherman to be notified that a fish strike has occurred, the tip-up must be within visible sight of the fisherman. This can be difficult if the fisherman is located at a great distance from the tip-up, or if the weather is bad such as in snowy conditions when it may be difficult to view the tip-up flag through the snow. The problem becomes even worse if the fisherman can not view the tip-up, for example when the fisherman is inside of a warming structure such as an ice shack or shanty, or when the fisherman is fishing at night in the dark.

It is desirable, therefore, to have an ice fishing tip-up that provides a notification or alert of a fish strike that can be more easily seen by a fisherman. Preferably, the ice fishing tip-up will also provide a notification or alert of a fish strike without having to be visually seen by the fisherman.

SUMMARY OF THE INVENTION

According to a first aspect of the invention, a fish strike indicating apparatus includes an enclosure configured to attach to an ice fishing tip-up. A transmitting apparatus is disposed inside of the enclosure. The transmitting apparatus is configured to transmit a wireless signal indicative of a fish strike to a mobile device. A receiving apparatus is also disposed inside of the enclosure. The receiving apparatus is configured to receive a wireless signal from the mobile device.

The fish strike indicating apparatus is configured to transmit data to the mobile device in one embodiment. The data is selected from the group consisting of temperature data, fish count data, battery life data, and data identifying the fish strike indicating apparatus in this embodiment. The fish strike indicating apparatus is configured to transmit data to the mobile device indicative of the number of fish strikes that have occurred at the ice fishing tip-up in another embodiment. In yet another embodiment, the fish strike indicating apparatus is configured to transmit information to the mobile device identifying the fish strike indicating apparatus.

The fish strike indicating apparatus is configured to transmit the fish strike indicating signal at a first rate of transmission immediately after a fish strike in one embodiment. Then, after a predetermined period of time following the fish strike, the fish strike indicating apparatus is configured to transmit the fish strike indicating signal at a second rate of transmission. The second rate of transmission is different from the first rate of transmission in this embodiment.

In another embodiment, the fish strike indicating apparatus includes memory and the fish strike indicating apparatus is configured to store personal information pertaining to a user in the memory. The fish strike indicating apparatus is configured to receive the personal information from the mobile device in another embodiment.

The fish strike indicating apparatus is configured to securely attach to a flag pole of a first ice fishing tip-up having a first diameter in one embodiment and is further configured in this embodiment to securely attach to a flag pole of a second ice fishing tip-up having a second diameter. The first diameter and the second diameter are different diameters in this embodiment.

In yet another embodiment, the fish strike indicating apparatus includes a light source and a light source enclosure. The light source is disposed inside of the light source enclosure. A reflecting member is disposed inside of the light source enclosure directly above the light source in this embodiment. The reflecting member is a frustoconical shaped reflecting member in another embodiment. The fish strike indicating apparatus includes a temperature sensor in one other embodiment.

According to a second aspect of the invention, a system for providing a notification when a fish strikes an ice fishing tip-up includes a first apparatus and an application. The first apparatus is configured to attach to an ice fishing tip-up and is further configured to transmit a wireless signal indicative of a fish strike. The application is configured to operatively run on a mobile device and is further configured to receive the fish strike indicating signal from the first apparatus.

The first apparatus is configured to receive a wireless signal transmitted from the mobile device in one embodiment. The first apparatus is configured to receive configuration parameters transmitted from the mobile device in another embodiment.

In yet another embodiment, the application is configured to receive a plurality of fish strike indicating signals from a plurality of apparatuses. Each of the plurality of apparatuses is attached to a different ice fishing tip-up and each of the plurality of apparatuses transmits one of the plurality of fish strike indicating signals. The application can be configured in this embodiment to provide a user of the application with notifications of fish strikes corresponding to only a selected group of the plurality of fish strike indicating signals.

The application is configured to receive a plurality of fish strike indicating signals from a plurality of apparatuses in another embodiment. Each of the plurality of apparatuses is attached to a different ice fishing tip-up and each of the plurality of apparatuses transmits one of the plurality of fish strike indicating signals. The application can be configured to provide an identifier for each of the plurality of apparatuses in this embodiment.

In another embodiment, the system includes a second apparatus remotely located from both the first apparatus and the mobile device. The second apparatus is configured to receive the fish strike indicating signal from the first apparatus. The second apparatus is further configured to boost and re-transmit the fish strike indicating signal for receipt by the application.

The first apparatus is configured such that the rate of transmission of the fish strike indicating signal is slowed after a set period of time following the fish strike in one embodiment. In another embodiment, the first apparatus is configured to transmit information indicative of a temperature at the time of the fish strike.

According to a third aspect of the invention, a method for indicating a fish strike at an ice fishing tip-up includes transmitting a wireless signal indicative of the fish strike from a first apparatus attached to the ice fishing tip-up and receiving the fish strike indicating signal transmitted from the first apparatus via an application operatively running on a mobile device.

The method includes displaying a name for the ice fishing tip-up on a display of the mobile device in one embodiment. The method includes transmitting a wireless signal from the mobile device and receiving the wireless signal transmitted by the mobile device via the first apparatus attached to the ice fishing tip-up in another embodiment.

The method includes receiving the fish strike indicating signal via a second apparatus located remote from both the first apparatus and the mobile device in one other embodiment. The second apparatus receives the fish strike indicating signal from the first apparatus in this embodiment, boosts the fish strike indicating signal, and re-transmits the fish strike indicating signal for receipt by the application.

Other principal features and advantages of the invention will become apparent to those skilled in the art upon review of the following drawings, the detailed description and the appended claims.

BRIEF DESCRIPTION OF THE DRAWINGS

The drawings, which constitute a part of the specification, are as follows.

Figure 1:
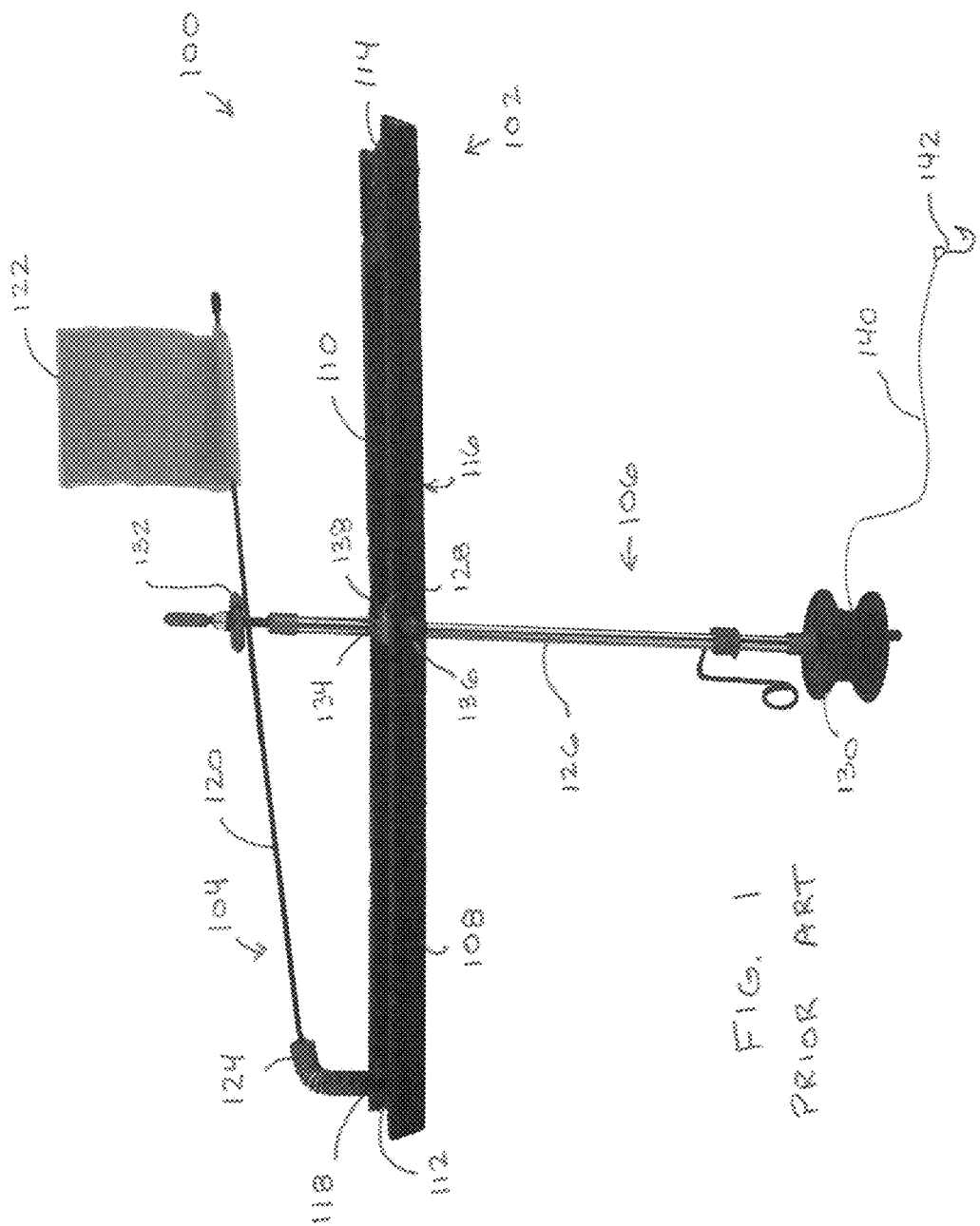
FIG. 1 shows a side and top isometric view of a prior art ice fishing tip-up device with the flag pole assembly shown in a horizontal "non-strike" indicating position.
Figure 2:
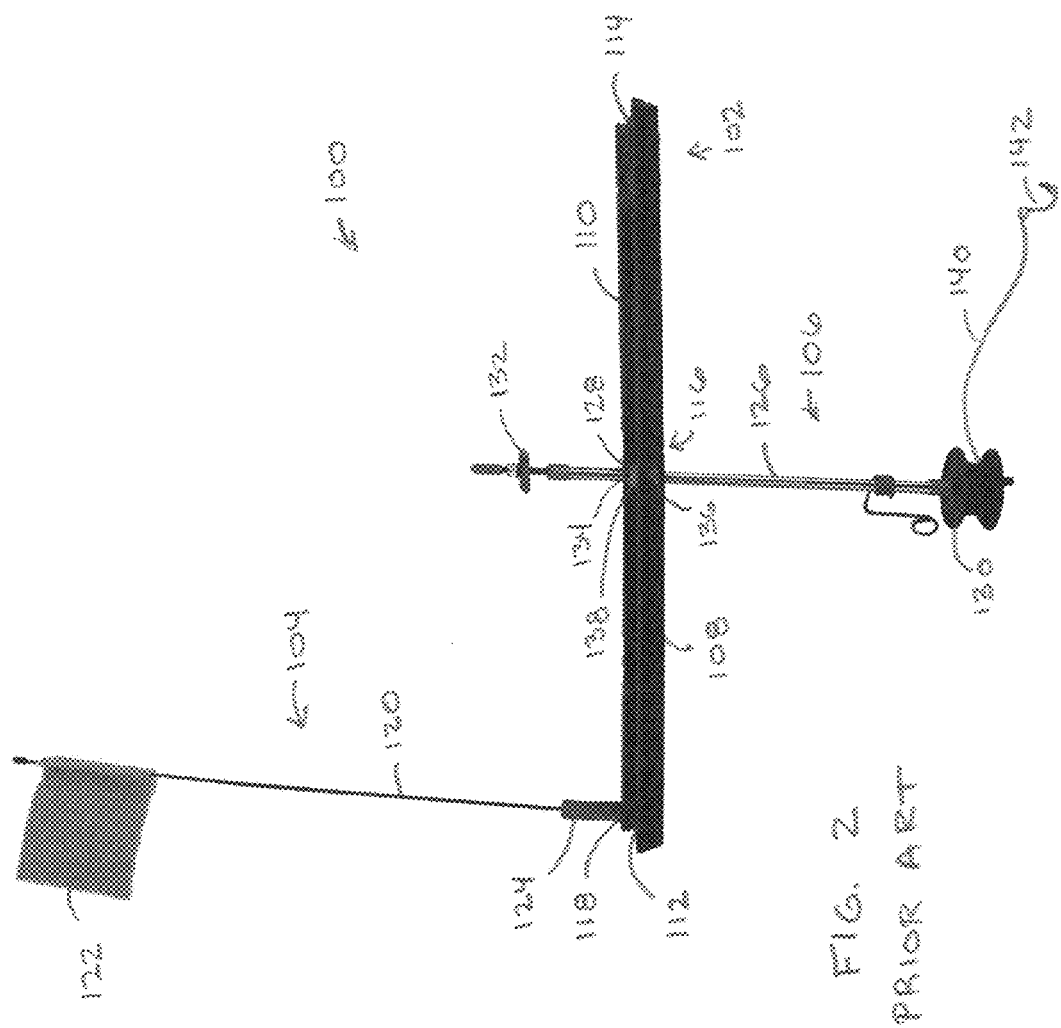
FIG. 2 shows a side and top isometric view of the prior art ice fishing tip-up device shown in FIG. 1 with the flag pole assembly shown in a vertical "strike" indicating position.

Before explaining at least one embodiment of the present invention in detail it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting. Like reference numerals are used to indicate like components.

DETAILED DESCRIPTION OF THE PREFERRED EMBODIMENTS

While the present invention will be illustrated with reference to a particular apparatus, system and method for providing an indication or notification to a fishermen when a fish strikes an ice fishing tip-up having particular configurations and particular features, the present invention is not limited to these configurations or to these features and other configurations and other features can be used.

Generally, the present invention involves an apparatus, system and method for providing an indication or notification to a fishermen when a fish strikes an ice fishing tip-up. A fish strike indicating apparatus or device in one embodiment clips to an ice fishing tip-up flagpole and provides an indication of when the tip-up flagpole has gone vertical and reached a strike indicating position. The fish strike indicating device in this embodiment includes an on/off switch, a tilt switch or rolling ball sensor, a wireless module and micro-controller/processor, a light, a battery, and an enclosure. In another embodiment of the present invention, the apparatus and system includes a tip-up.

The on/off switch is used to enable the apparatus. When the switch is "off," the apparatus cannot send, receive or process any wireless signals or light-up. When the switch is "on," the apparatus is "armed" and is capable of sending, receiving and processing wireless signals and lighting-up. The rolling ball sensor is electrically connected in series with the on/off switch in this embodiment. When the on/off switch is on, and the rolling ball sensor is physically sideways (e.g., when the tip-up flagpole to which the fish strike indicating device is attached is in the horizontal non-strike indicating position), then the electrical circuit inside of the fish strike indicating device is electrically an "open" circuit (e.g., "deactivated") and the fish strike indicating device cannot send, receive or process any wireless signals or light-up. When the fish strike indicating device is tilted at an angle of 45 degrees of vertical or less (e.g., when the tip-up flagpole to which it is attached is moving toward or reaches the vertical strike indicating position), the rolling ball sensor "closes" the electrical circuit (e.g., "activated"), and the micro-controller/processor inside of the fish strike indicating device is powered which causes the light to light-up and flash intermittently, and wireless signals to be broadcast from the device.

Bi-directional communication is allowed in one embodiment so that the fish strike indicating device can wirelessly receive (e.g., via the receiver or receiving circuitry disposed inside of the fish strike indicating device) signals and commands and configuration options, and wirelessly transmit (e.g., via the transmitter or transmitting circuitry disposed inside of the fish strike indicating device) data including temperature, fish count, battery life, and the unique identifier of the apparatus (which also uniquely identifies the ice fishing tip-up to which the apparatus is attached). In one embodiment, the fish strike indicating device communicates bi-directionally using a Blue Tooth Low Energy communication protocol. As such, the fish strike indicating device in this embodiment has the capability to communicate with any remotely located computing or communication device that uses this communication protocol including many commercially available smart phones and tablet computers, and other mobile computing or communication devices. In other embodiments of the present invention, the fish strike indicating device communicates using other communication protocols and/or does not communicate bi-directionally.

A transceiver or repeater is provided in one embodiment of the present invention to communicate with the fish strike indicating device. The transceiver has the capability to both receive wireless signals (e.g., like a pager or paging device) and to boost and re-transmit or re-broadcast received wireless signals (e.g., like a repeater or repeating device) in this embodiment. The transceiver can thus receive a wireless signal from a nearby fish strike indicating device located within its receiving range, boost the power level of the received signal, and re-transmit or re-broadcast the boosted wireless signal out to fishermen that, but for the transceiver, would not be able to receive the wireless signal directly from the fish strike indicating device. This might occur, for example, when a fisherman (and similarly, the fisherman's mobile computing or communication device) is located outside of the normal signally range of the fish strike indicating device or if the fisherman's location is shielded from receiving signals directly from the fish strike indicating device such as, for example, when the fisherman is in and around an ice fishing shanty or shack. This is specially true if the ice fishing shanty or shack is constructed in whole or in part of metal.

The transceiver/repeater includes a three-position on/off switch, a buzzer, a light source, a wireless communications module and micro-controller/processor, volatile and non-volatile memory or storage, a battery, and an enclosure. The battery is provided to supply power to the transceiver. The on/off switch turns the transceiver on and off. When turned off, the transceiver is not able to receive or re-transmit any signals. The transceiver begins listening for wireless signals being transmitted by fish strike indicating devices within its operating range when it is turned on.

In one mode of operation, the transceiver begins to buzz and light-up immediately upon receiving a wireless signal from a fish strike indicating device. This alerts the user that a fish strike has occurred. In another mode of operation, the transceiver does not buzz or light-up upon receiving a wireless communication signal from a fish strike indicating device.

In one embodiment of the present invention, the transceiver will, upon receiving a wireless signal from a fish strike indicating device, and regardless of the mode of operation, boost the signal and re-broadcast or re-transmit the signal to locations that might not normally be within the operating or signal range of the fish strike indicator itself. In this way, the transceiver allows for enhanced reception of wireless signals from fish strike indicating devices that are remote or located far away, or that may be shielded such as behind metal ice fishing shacks or shanties. In other embodiments of the present invention, the transceiver may or may not boost and re-transmit a received signal depending on its mode of operation.

The fish strike indicating device includes permanent non-volatile (e.g., non-transitory) data storage or memory in one embodiment of the present invention. This allows a fisherman to program certain information and data into the apparatus and to save that information and data on the device (e.g., in the permanent non-volatile memory). This information can include, for example, a name or nickname for the fish strike indicating device. The name or nickname can then be used as an aid in identifying the fish strike indicating device and/or the ice fishing tip-up to which it is attached. Other information including the name, telephone number(s), e-mail address, and/or mailing address of the fisherman or user can be programmed into and stored in the permanent non-volatile memory of the fish strike indicator in other embodiments. This personal information may prove to be useful in the event that the fish strike indicator device is ever lost or stolen.

In another embodiment of the present invention, the fish strike indicator is programmed to have a resettable fish counter. The fish counter increments each time that the device is activated by a fish strike.

In another embodiment of the present invention, the fish strike indicator is programmed to provide "wiggle" protection. "Wiggle" protection prevents the fish strike indicator device from falsely incrementing the fish counter and from transmitting wireless signals while the tip-up flagpole to which it is attached is still moving back and forth by more than 45 degrees of vertical which usually happens immediately after a fish strike occurs as discussed earlier in this disclosure. Such uncontrolled back and forth movement can cause the rolling ball sensor inside of the fish strike indicator apparatus to "open" and "close" repeatedly while the flagpole is settling into a final vertical strike indicating position.

This in turn can cause the fish strike indicator's fish counter to increment incorrectly and can cause wireless signals to be interrupted intermittently while the flagpole is settling into a final vertical strike indicating position.

In one other embodiment of the present invention, the fish strike indicating device can be programmed to progressively "back-off" in its wireless transmissions so that over time after a fish strike event, the device will transmit wireless signals less and less frequently (e.g., a slower rate of transmission) to conserve battery power. In one embodiment, for example, the fish strike indicating device will transmit constantly (e.g., continuous rate of transmission) immediately after a fish strike occurs to help insure that the signal is received by a fisherman or other user. After a predetermined period of time (e.g, the "back-off" time), however, the fish strike indicating device will transmit less frequently to conserve battery power and life.

Other embodiments of the present invention allow for temperature and battery life sensing and reporting. An internal sensor inside of the fish strike indicating device reports the battery life and the internal temperature of the device in this embodiment. The internal temperature of the device is used in this embodiment as an indication of, or as a proxy for, the outside air temperature.

FIGS. 3 through 9 show a fish strike indicating device 200 in accordance with one embodiment of the present invention. Fish strike indicator 200 includes an enclosure or housing 202, a light source 204 (see FIGS. 10 and 11), a lens or light source cover or enclosure 206, an on/off switch 208, a pair of mounting fingers 210, 212 and a pair of mounting channels 214, 216.

Housing 202 is made from a durable ABS plastic material and is a two piece housing assembly in this embodiment comprised of a front housing cover 218 and a rear housing cover 220. Light source 204 is disposed at one end of housing 202. Light source cover 206 surrounds and encloses light source 204. Front housing cover 218 includes a recessed portion 222 and a hole 224 through which on/off switch 208 protrudes. Recessed portion 222 is provided to allow for easy access to and use of on/off switch 208 in this embodiment.

Light source 204 is an amber colored light emitting diode ("LED") in this embodiment. LEDs of this type generally have a cone of light emission which is vertical to the LED. As used in fish strike indicator 200, however, it is desirable that the light be directed out horizontally from fish strike indicator 200 so that it can be seen more easily by fisherman.

As a result, light source cover 206, which surrounds light source 204, is shaped to try and maximize the visibility at night of the light emitted from light source 204 (see FIGS. 15 through 19). This is accomplished by piping the light coming out of light source 204 and directing it so that it is reflected out from light source cover 206 at all angles. More specifically, in this embodiment, light source cover 206 is a dome shaped structure having an elliptically shaped cross section.

Light source cover 206 in this embodiment includes a top wall 250 and upwardly facing curved front and rear walls 252, 254 (see FIGS. 15 through 19). Upwardly facing curved front and rear walls 252, 254 are directly connected to each other on one side of cover 206 and are indirectly connected to each other on the other side of cover 206 by way of an upwardly facing sidewall 256. Top wall 250 is connected to front and rear walls 254, 256 by way of downwardly sloping curved front and rear walls 258, 260 respectively. Similarly, top wall 250 is connected to side wall 256 by way of downwardly sloping curved sidewall 262 in this embodiment.

Extending downward inside of light source cover 206 from the underside of top wall 250 is frustoconical shaped reflecting member 264. Frustoconical shaped reflecting member 264 is positioned inside of light source cover 206 such that when cover 206 is mounted on enclosure 202 of fish strike indicator 200, reflecting member 264 is disposed directly above light source 204. As previously mentioned, the light emitted from LED light source 204 in this embodiment is a cone of light that is generally directed vertically upward from light source 204. Reflecting member 264 is therefore positioned directly in the path of the cone of light emitted from light source 204 in this embodiment. The light emitted from light source 204 first impinges upon reflecting member 264, is then reflected off of the sides of reflecting member 264, and is then transmitted or piped out of light source cover 206 at all angles.

Light source cover 206 in this embodiment is made from a plastic material, such as, for example, standard polypropylene. Polypropylene is a durable material and the translucency of polypropylene allows light to diffuse evenly which is also desirable. Housing 202 in this embodiment is made from ABS plastic material which provides durability and performance in cold and extreme weather.

It should be understood that the present invention is not necessarily limited to light sources that are LEDs. In other embodiments of the present invention, for example, other types of light sources are used. Similarly, it should be understood that housing 202 and light source cover 206 are not limited to the shape or materials described herein and in other embodiments of the present invention, other shapes and materials are used for housing 202 and for light source cover 206 including without limitation for reflecting member 264.

Figure 3:
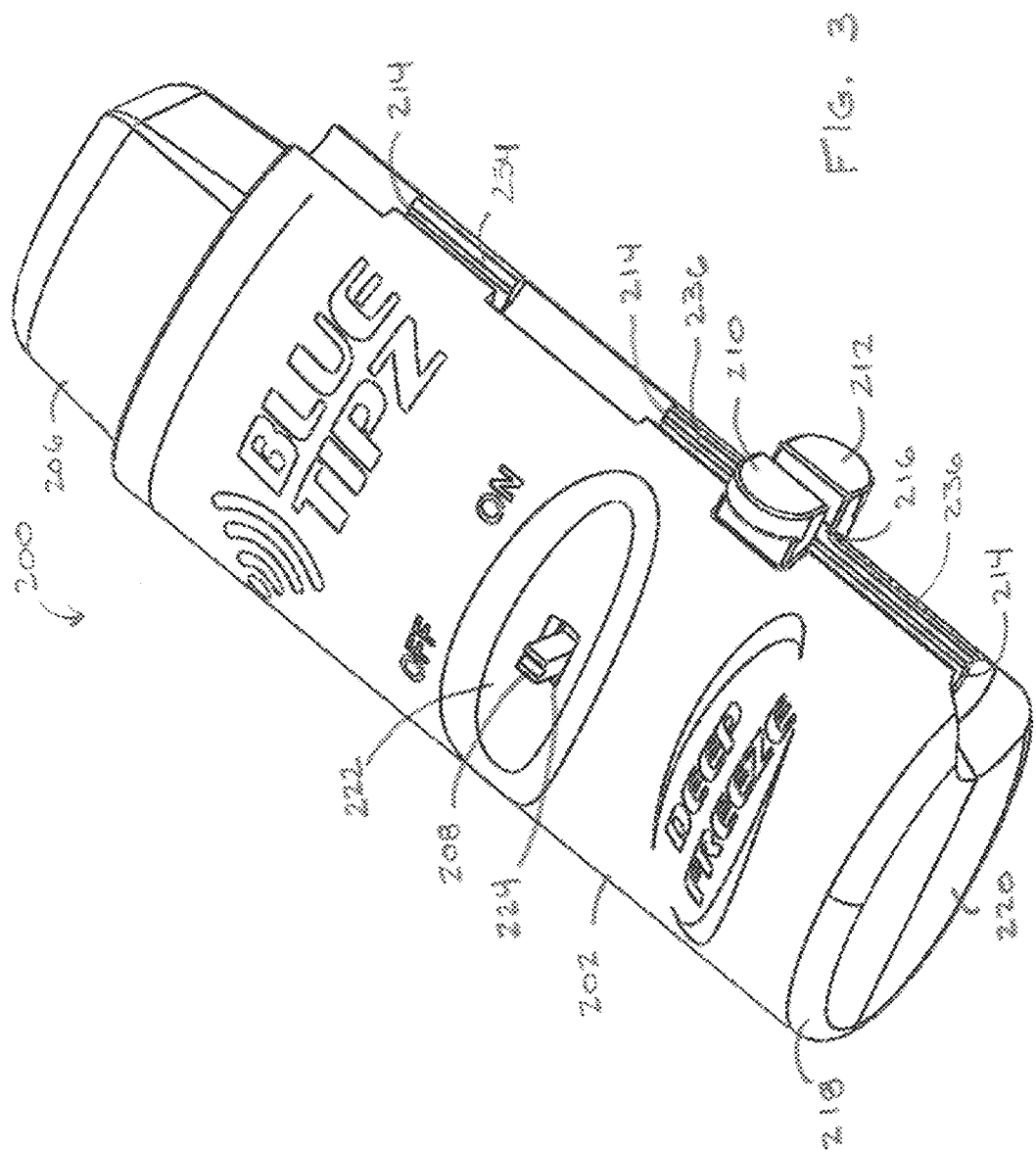
FIG. 3 shows a front, bottom and right side isometric view of a fish strike indicating device in accordance with one embodiment of the present invention.
Figure 4:
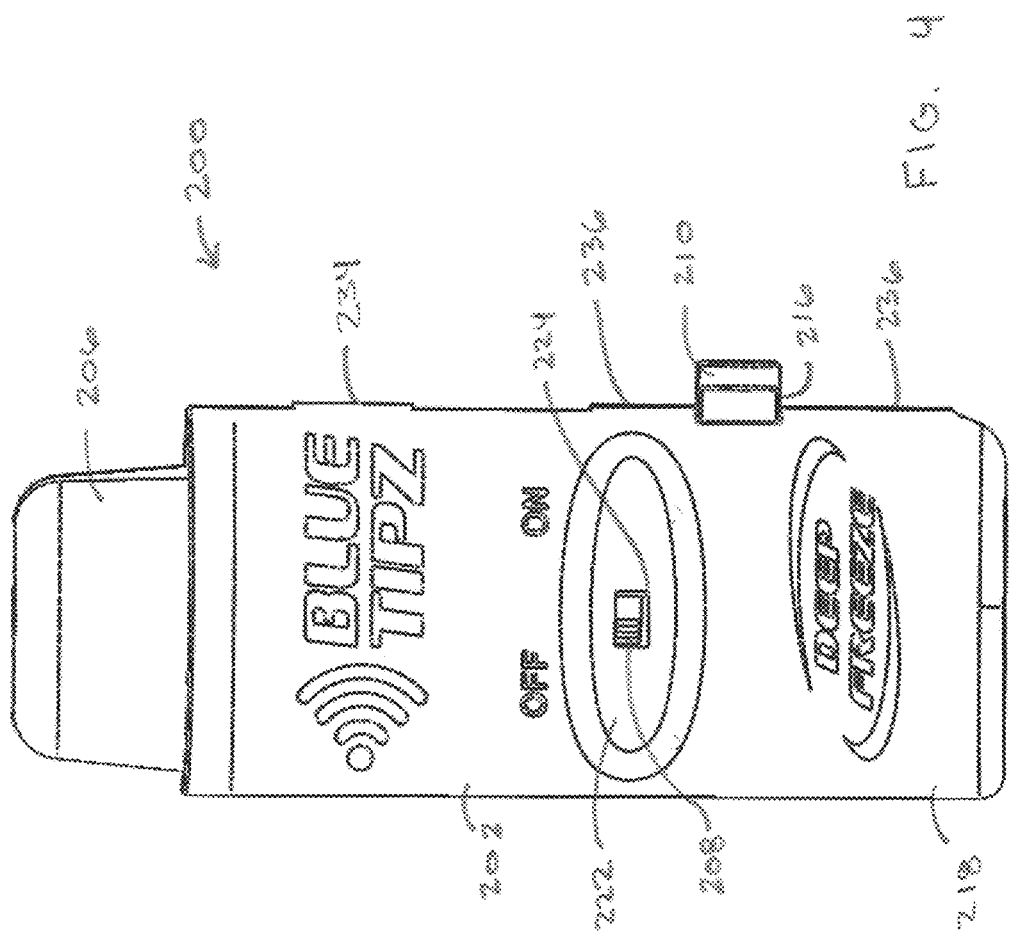
FIG. 4 shows a front elevation view of the fish strike indicating device shown in FIG. 3.
Figure 5:
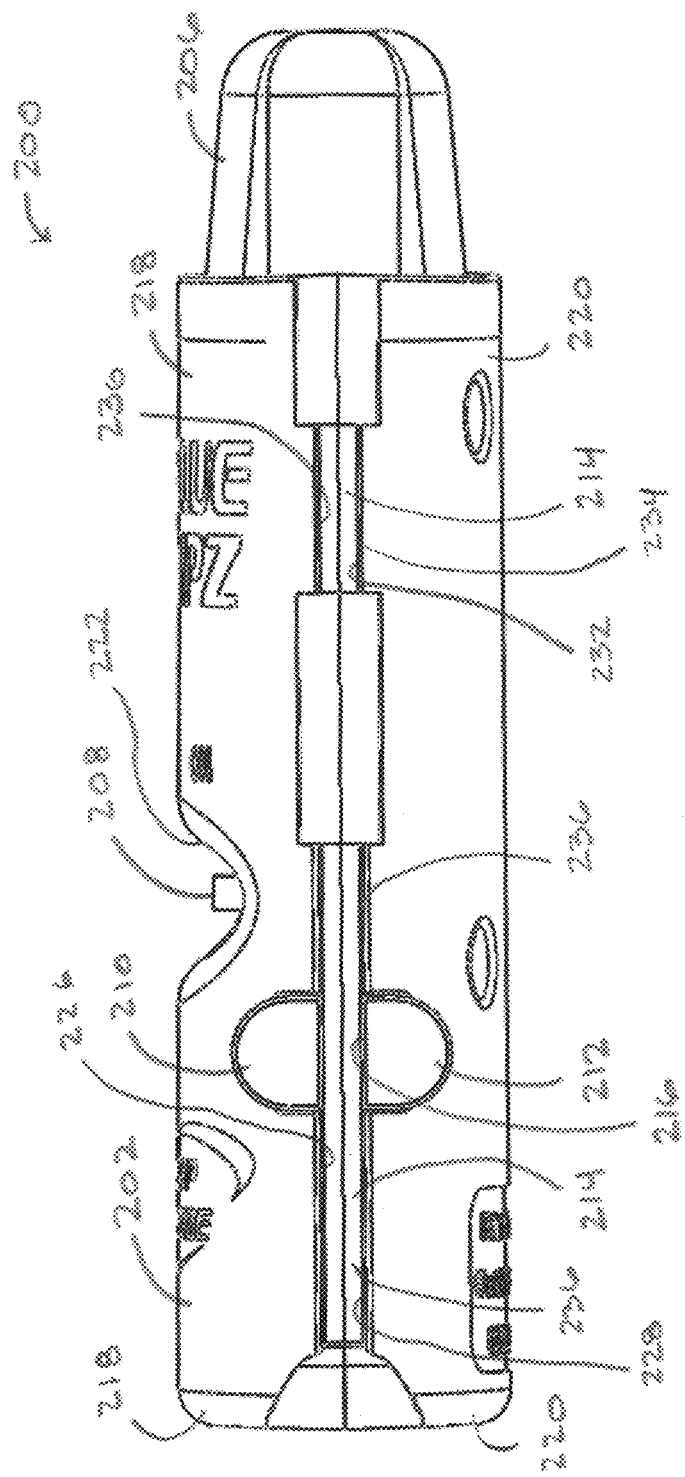
FIG. 5 shows a right side elevation view of the fish strike indicating device shown in FIG. 3.
Figure 6:
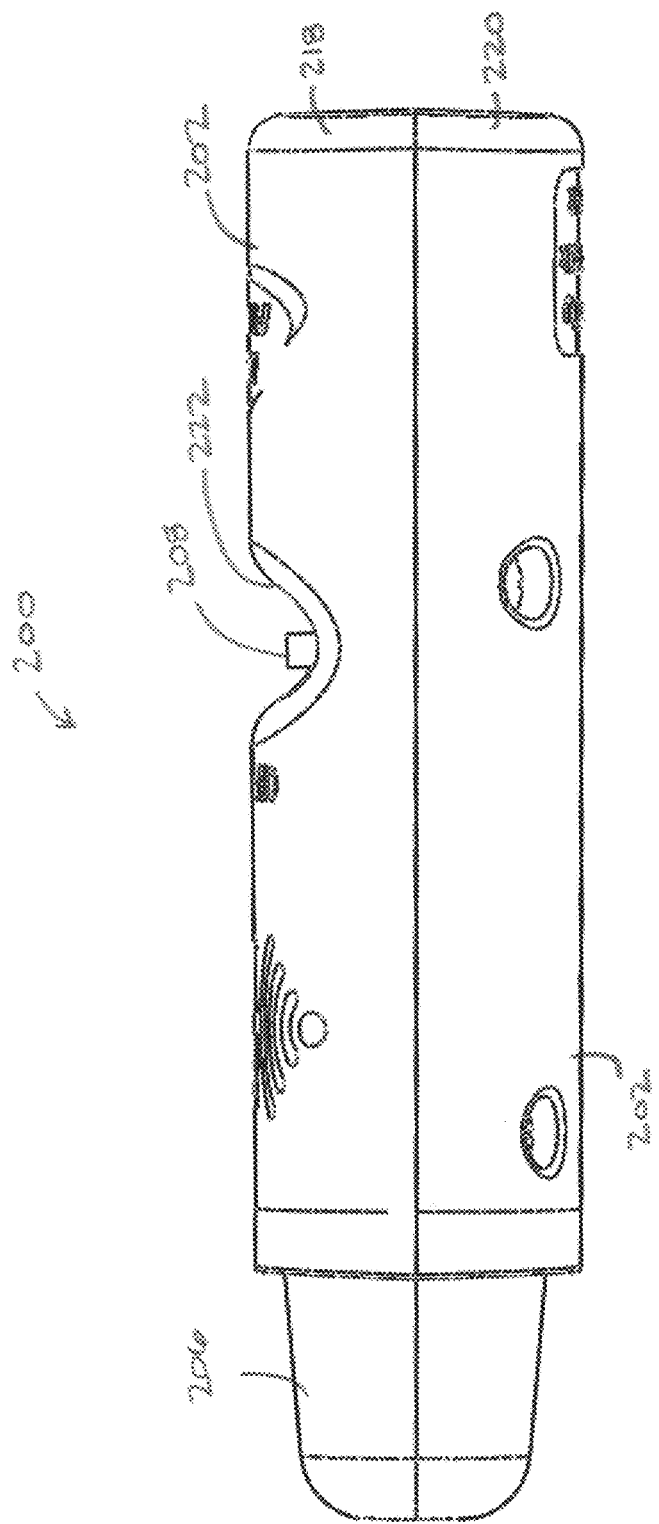
FIG. 6 shows a left side elevation view of the fish strike indicating device shown in FIG. 3.
Figure 7:
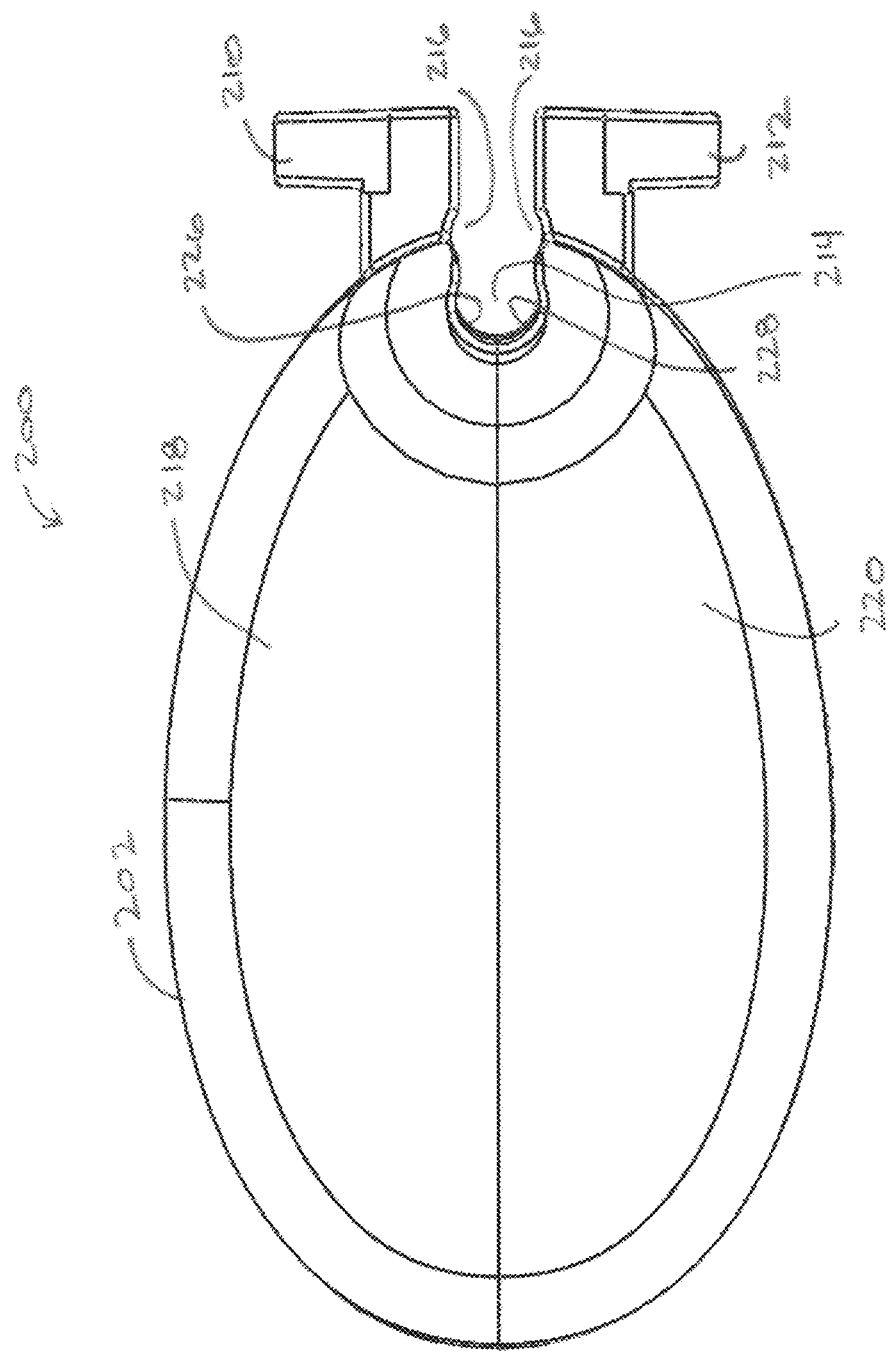
FIG. 7 shows a bottom plan view of the fish strike indicating device shown in FIG. 3.
Figure 8:
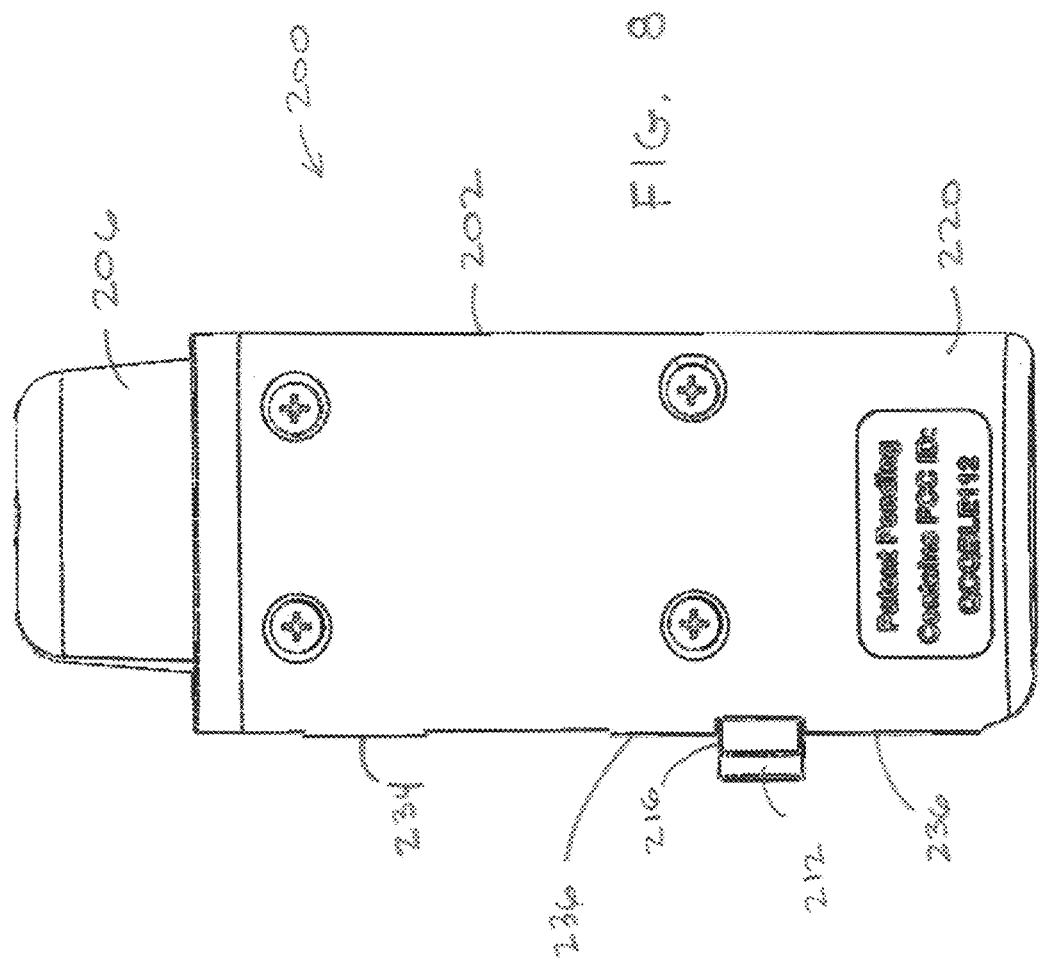
FIG. 8 shows a rear elevation view of the fish strike indicating device shown in FIG. 3.

Mounting fingers 210, 212, each of which extend outward from the side of front and rear housing covers 218, 220 respectively, are disposed opposite each other on the side of housing 202 (see FIGS. 3 and 7). In addition to mounting fingers 210, 212, housing 202 also includes mounting channel 214 which runs longitudinally along the side of housing 202 below mounting fingers 210, 212. Second mounting channel 216 is disposed adjacent to and parallel with mounting channel 214 and between mounting fingers 210, 212. The purposes for mounting fingers 210, 212 and mounting channels 214, 216 will be more fully described below.

Figure 20:
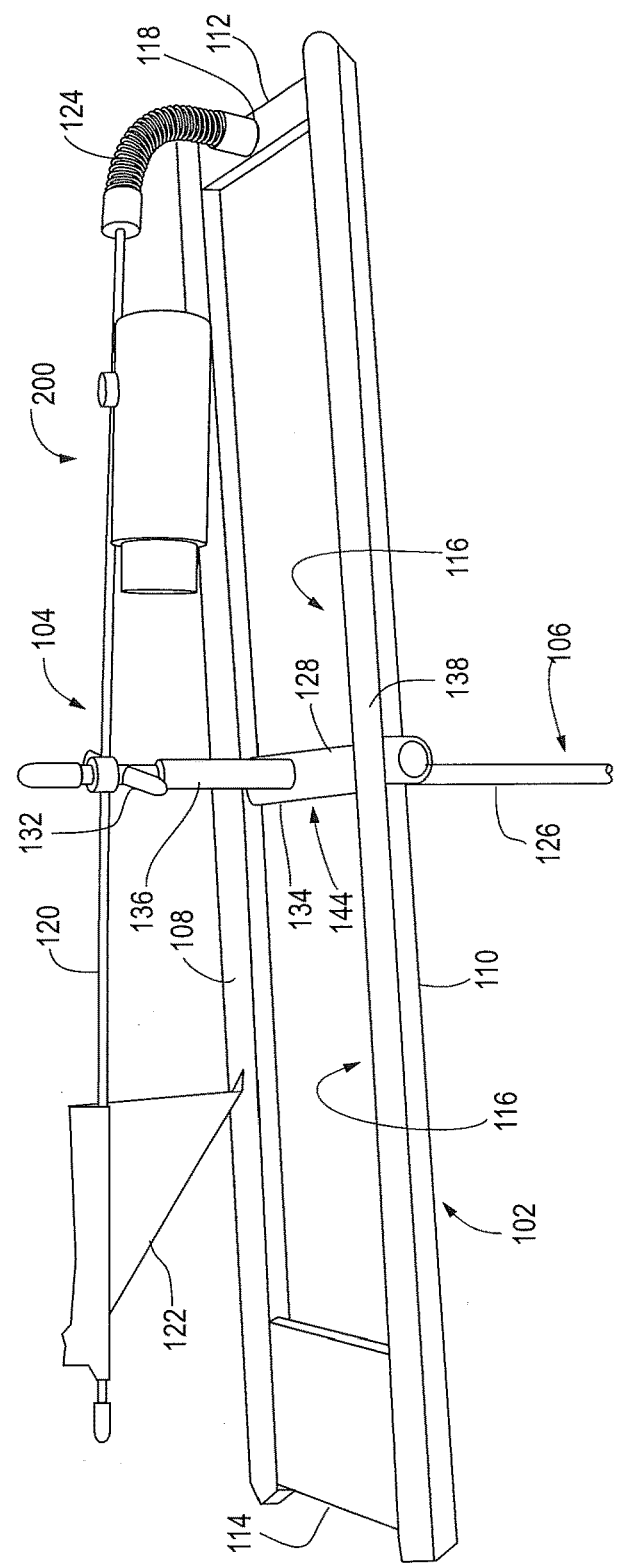
FIG. 20 shows a side and top isometric view of an ice fishing tip-up device with the flag pole assembly shown in a horizontal "non-strike" indicating position and with a fish strike indicating device attached in accordance with one embodiment of the present invention.
Figure 21:
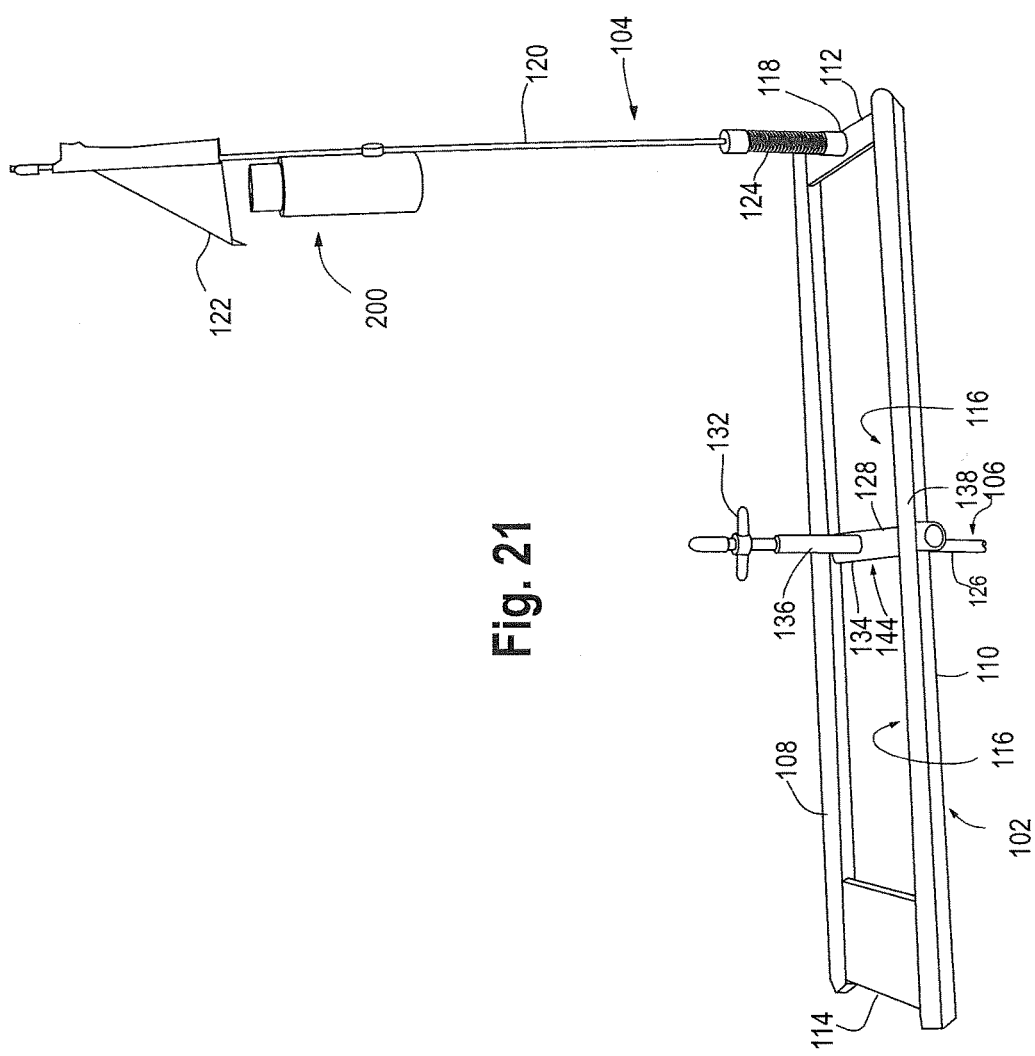
FIG. 21 shows a side and top isometric view of an ice fishing tip-up device with the flag pole assembly shown in a vertical "strike" indicating position and with a fish strike indicating device attached in accordance with a second embodiment of the present invention.

Fish strike indicator 200 is shown mounted at various locations to prior art tip-up device 100 in FIGS. 20 and 21. In FIG. 20, for example, fish strike indicator 200 is shown mounted to flagpole 120 just above spring 124. In FIG. 21, fish strike indicator 200 is mounted to flagpole 120 at a different location, namely just below flag 122. It should be understood that the mounting of fish strike indicator 200 is not limited to the two positions shown in the figures. Fish strike indicator 200 can be mounted at any location along the entire length of flagpole 120 including above and below flag 122 depending on the location of flag 122 on flagpole 120.

Figure 13:
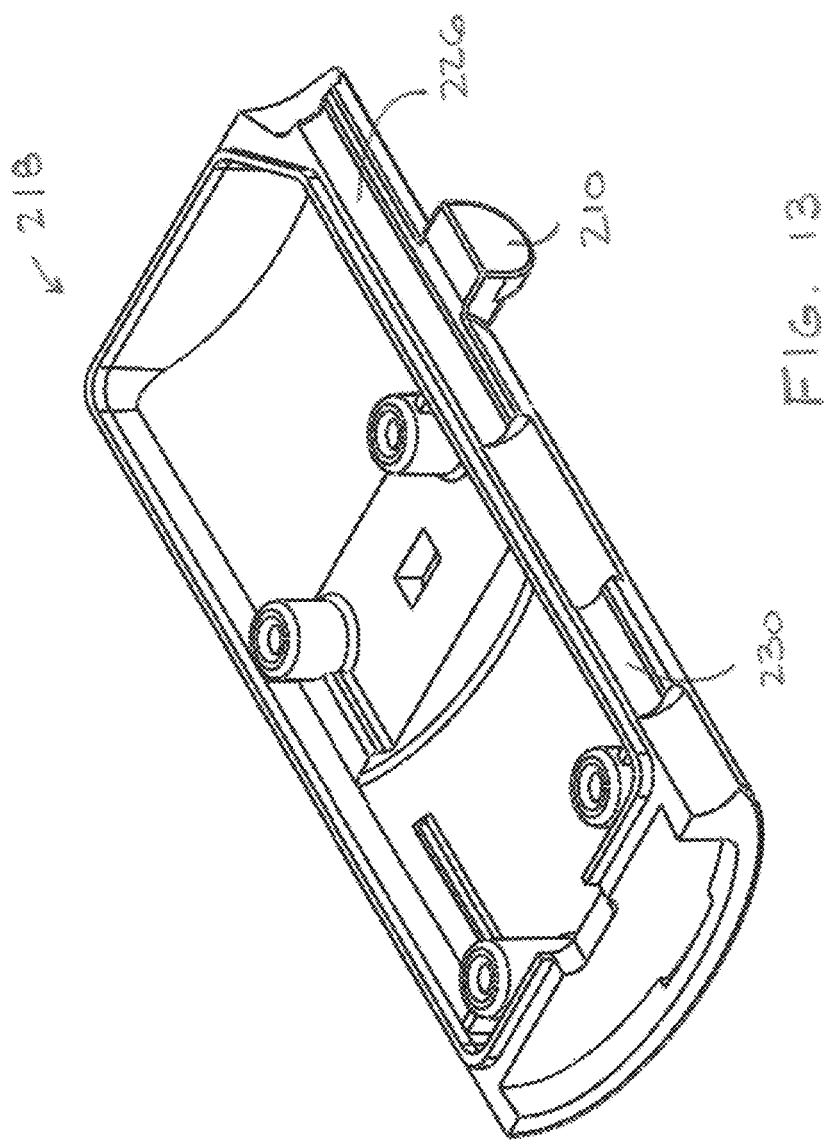
FIG. 13 shows a rear, top and right side isometric view of a front housing cover used in the fish strike indicating device shown in FIG. 3.
Figure 14:
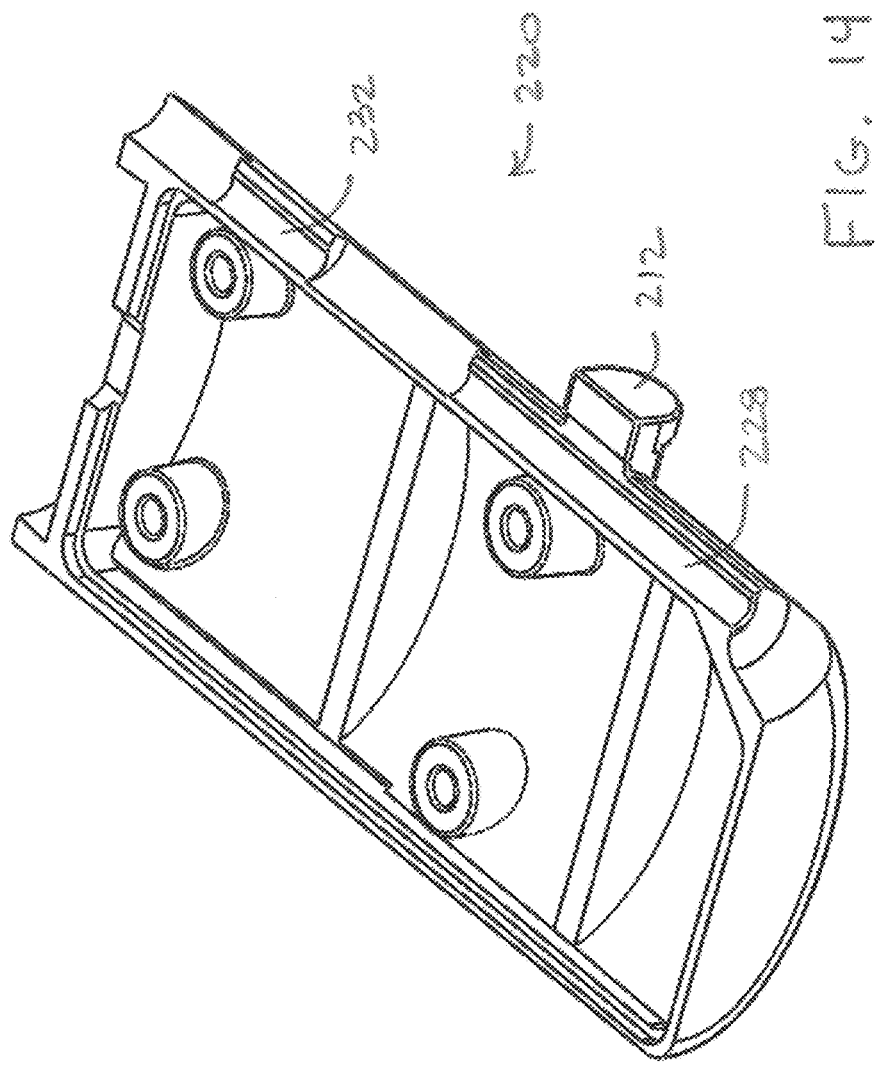
FIG. 14 shows a rear, bottom and right side isometric view of a rear housing cover used in the fish strike indicating device shown in FIG. 3.
Figure 15:
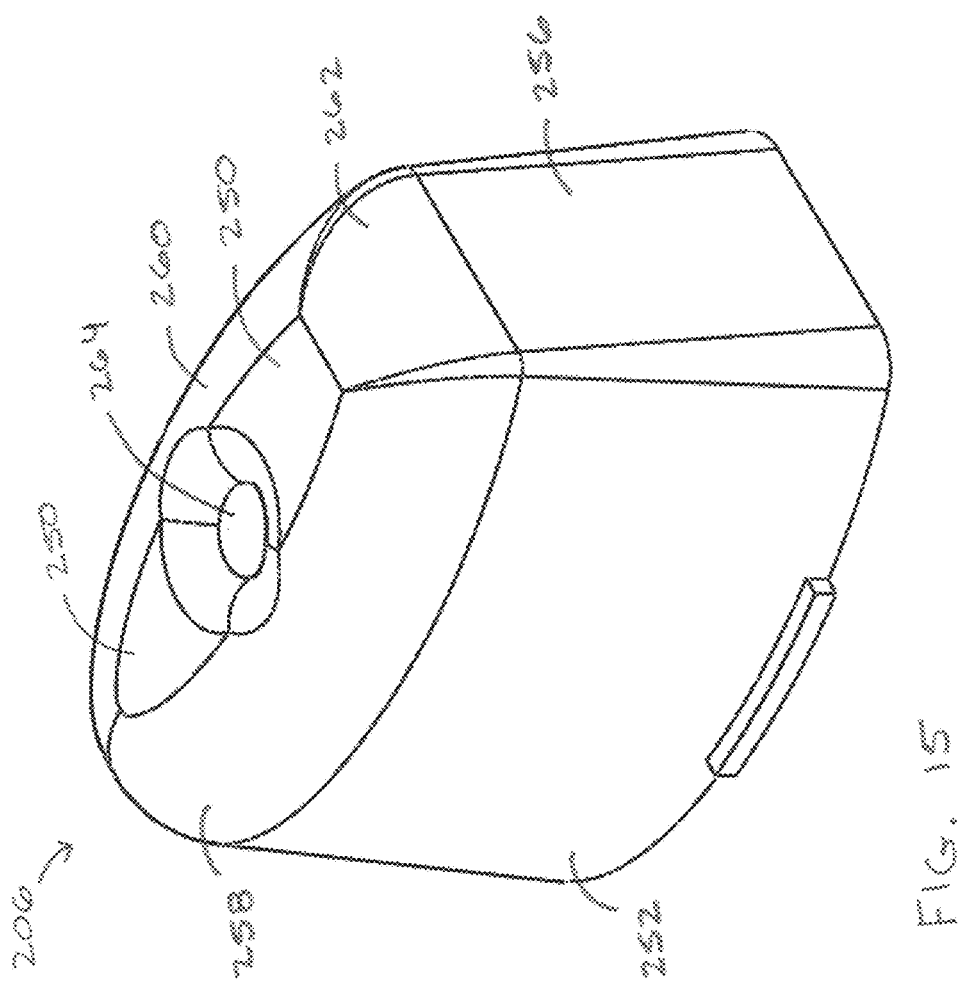
FIG. 15 shows a front, top and right side isometric view of a light source cover used in the fish strike indicating device shown in FIG. 3.
Figure 16:
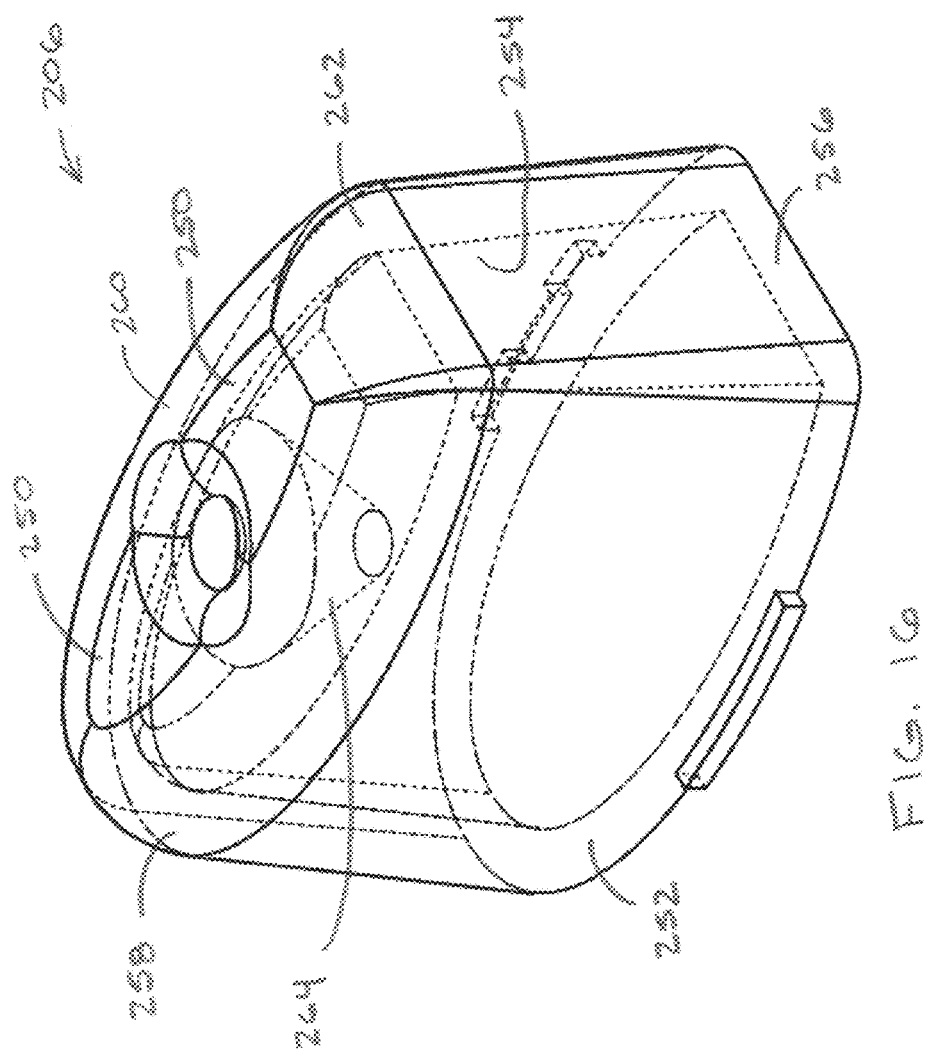
FIG. 16 shows a front, top and right side isometric view including internal phantom lines of the light source cover shown in FIG. 15.
Figure 17:
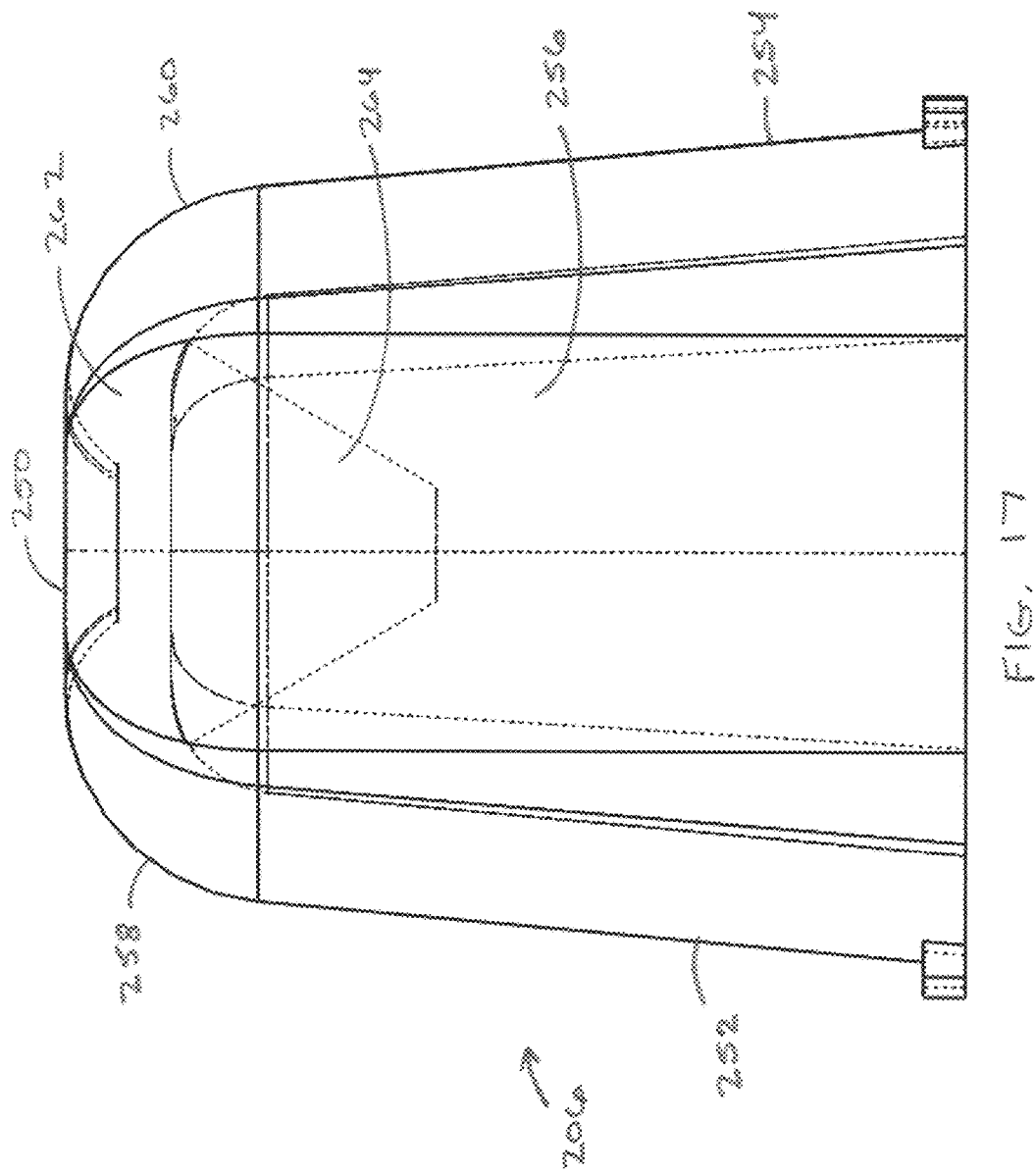
FIG. 17 shows a right side elevation view including internal phantom lines of the light source cover shown in FIG. 15.
Figure 18:
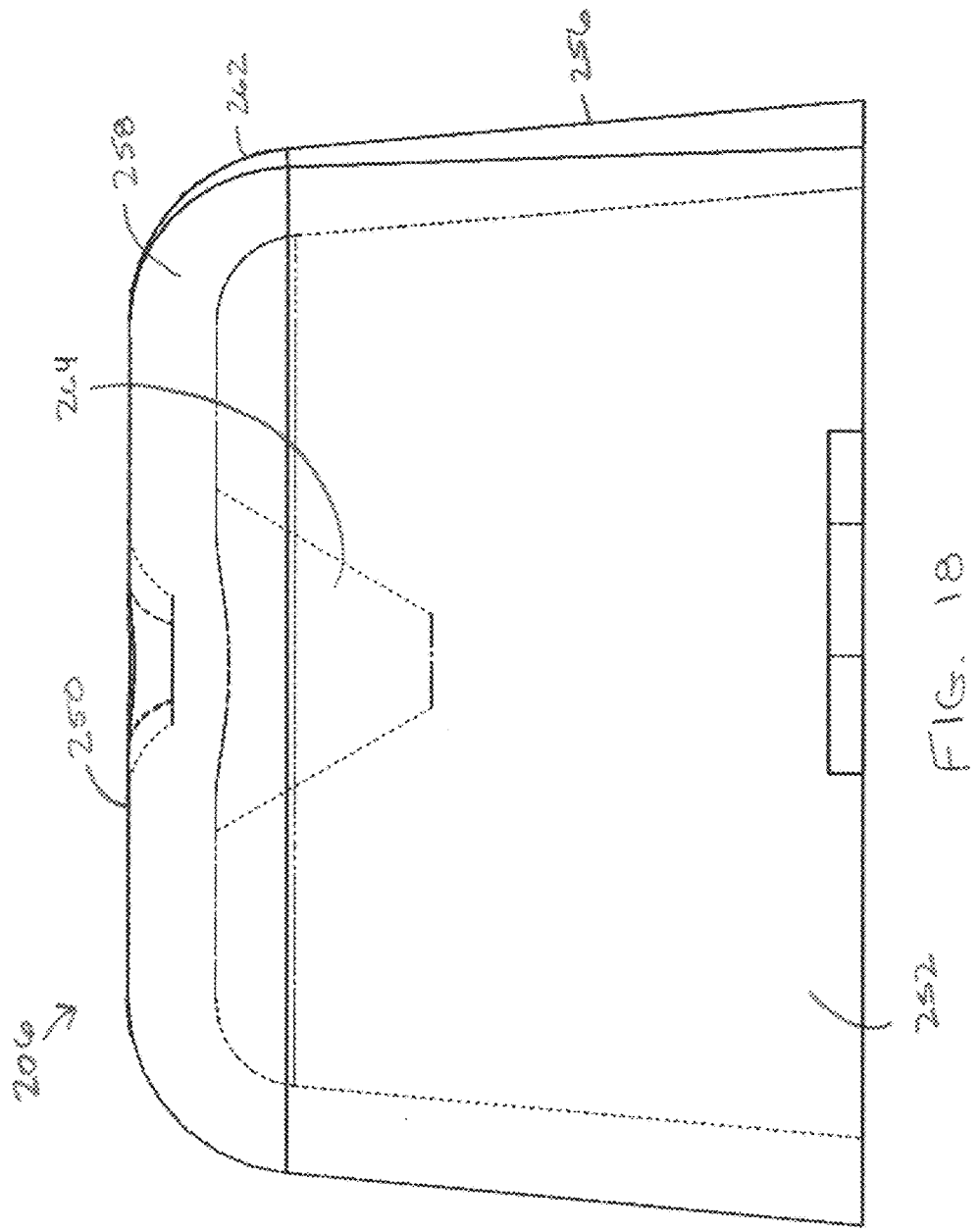
FIG. 18 shows a front elevation view including internal phantom lines of the light source cover shown in FIG. 15.
Figure 19:
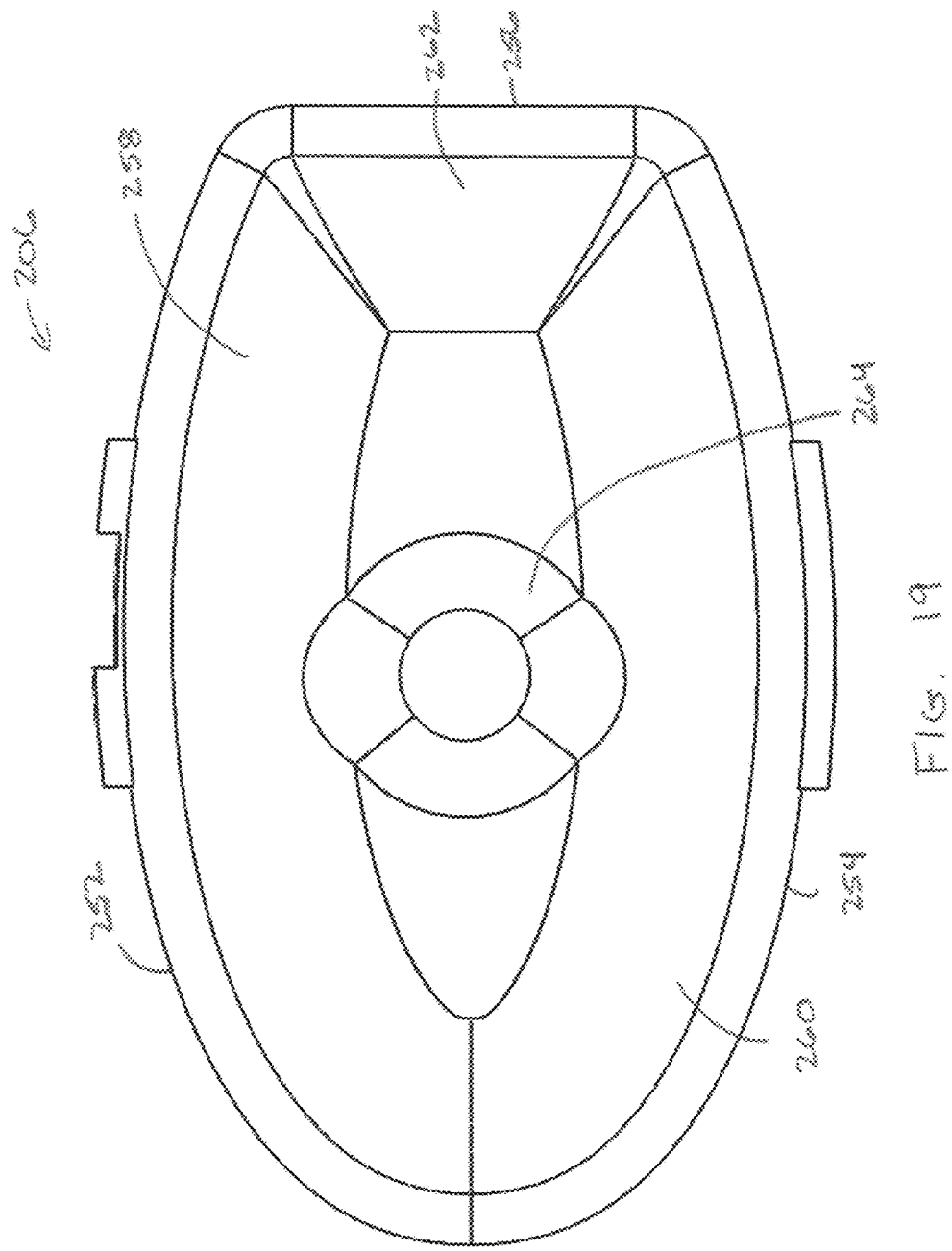
FIG. 19 shows a top plan view of the light source cover shown in FIG. 15.
Figure 22:
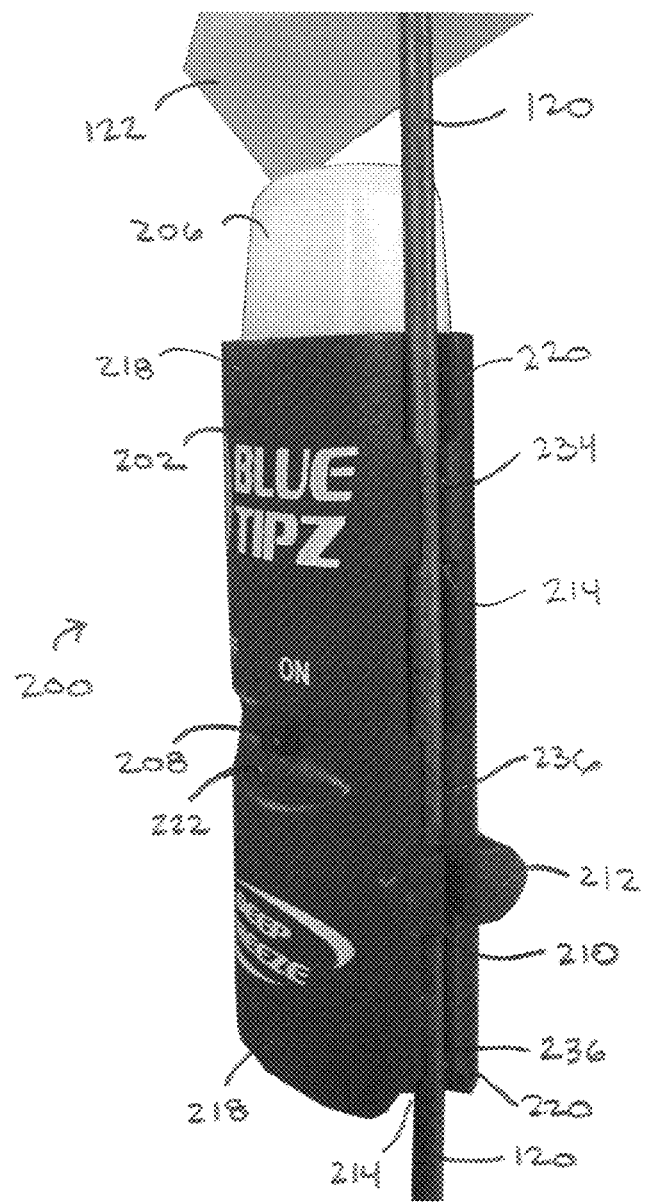
FIG. 22 shows a close-up front, top and right side isometric view of a fish strike indicating device attached to a tip-up flag pole assembly in accordance with one embodiment of the present invention.

As can best be seen from FIG. 22, fish strike indicator 200 is mounted to flagpole 120 via mounting channel 214 in this embodiment. More specifically, cylindrical mounting channel 214 is provided along one side of housing 202 to receive cylindrical flagpole 120 therein. Channel 214 is formed on the side of housing 202 by a first pair of complimentary curved channel side wall members 226, 228 and a second shorter pair of complimentary curved channel side wall members 230, 232 (see FIGS. 13 and 14). Curved channel sidewall members 226, 230 are disposed along the longitudinal side edge of front housing cover 218 while channel sidewall members 228, 232 are disposed in curved complimentary fashion along the longitudinal side edge of rear housing cover 220 to form mounting channel 214.

Complimentary curved channel side wall members 226, 228 are located below mounting fingers 210, 212 near the bottom end of housing 202 while shorter complimentary curved channel side wall members 230, 232 are located near the top end of housing 202. Mounting channel 214 in this embodiment is thus comprised of an upper mounting channel portion 234 near the upper end of fish strike indicator 200 and a lower mounting channel portion 236 near the lower end of fish strike indicator 200.

The diameter of cylindrical mounting channel 214 formed between channel sidewall members 226, 228 and channel side wall members 230, 232 is chosen to allow cylindrical flagpole 120 to easily snap between the outer edges of sidewall members 226, 228, 230, 232 respectively and into channel 214 such that flagpole 120 fits snugly, tightly and securely into mounting channel 214. In addition, having two separate mounting channel portions 234, 236, one on each end of fish strike indicator 200, provides for a more secure connection between channel 214 and flagpole 120 in this embodiment.

In addition to longitudinal mounting channel 214, a second channel 216 is provided on the side of fish strike indicator 200. As can best be seen in FIG. 7, channel 216 is located between mounting fingers 210, 212 and is of a slightly larger diameter than is mounting channel 214. Mounting channel 216 is provided to accommodate flagpoles that are of a slightly larger diameter than can be accommodated by mounting channel 214. In this way, fish strike indicator 200 has the capability to be used with, and securely attached to, a wide assortment of existing tip-up devices, namely tip-up devices having flagpoles of differing diameters.

In an alternative embodiment not shown in the figures, fish strike indicator 200 is mounted directly to flag 122. In this embodiment, flag 122 is made of a thick semi-rigid or rigid material and includes a vertically directed (e.g., flagpole 120 is upright and positioned vertically at this time) oval slot that is sized to tightly receive mounting fingers 210, 212. Fish strike indicator 200 is mounted to flag 122 in this embodiment by first positioning fish strike indicator 200 in a horizontal orientation adjacent to flag 122 and perpendicular to flagpole 120 (e.g., again, flagpole 120 is upright and positioned vertically at this time).

Mounting fingers 210, 212 are then aligned with, and are inserted into and through, the upwardly directed oval slot in flag 122. With mounting fingers 210, 212 inserted into and through the oval slot in flag 122, fish strike indicator 200 is turned from a horizontal orientation upward to a vertical orientation parallel with flag pole 120. Turning fish strike indicator 200 to a vertical orientation results in fingers 210, 212 being oriented in the horizontal direction which secures and locks fish strike indicator 200 to flag 122 in this embodiment.

Figure 9:
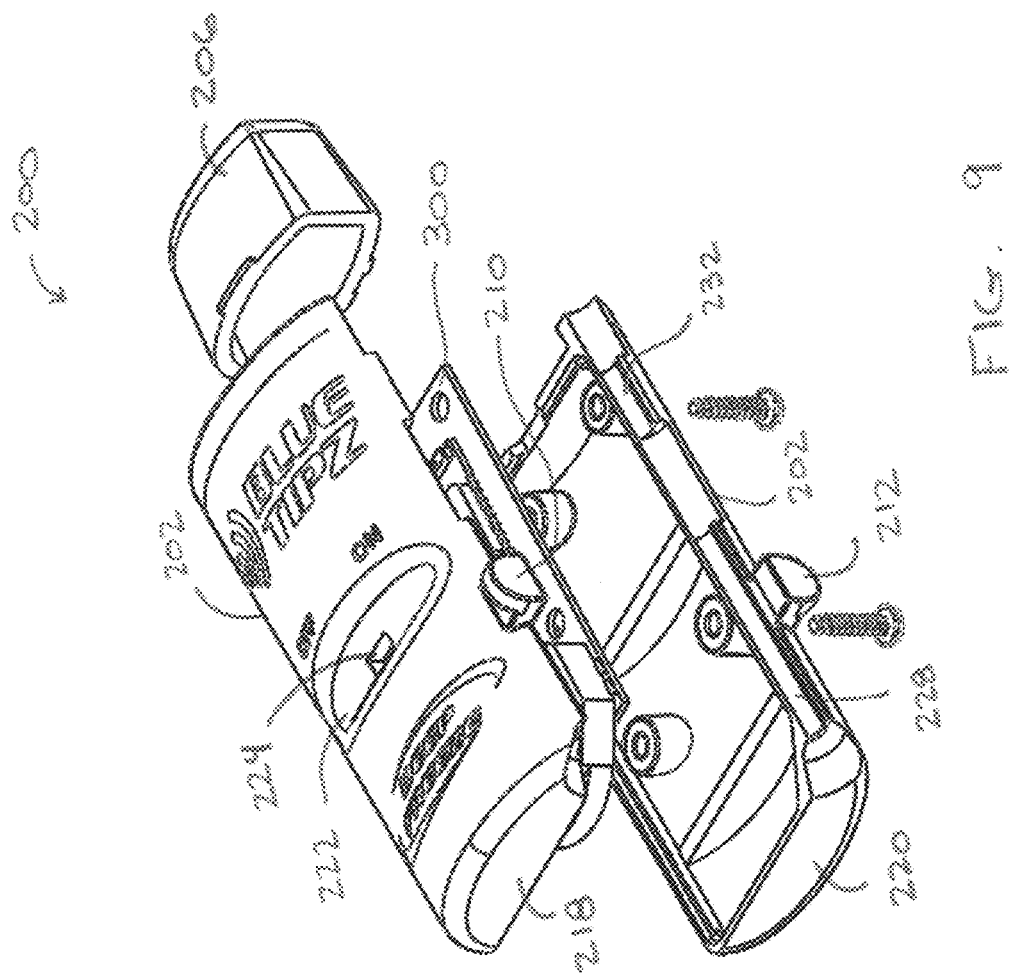
FIG. 9 shows an exploded front, bottom and right side isometric view of the fish strike indicating device shown in FIG. 3.
Figure 10:
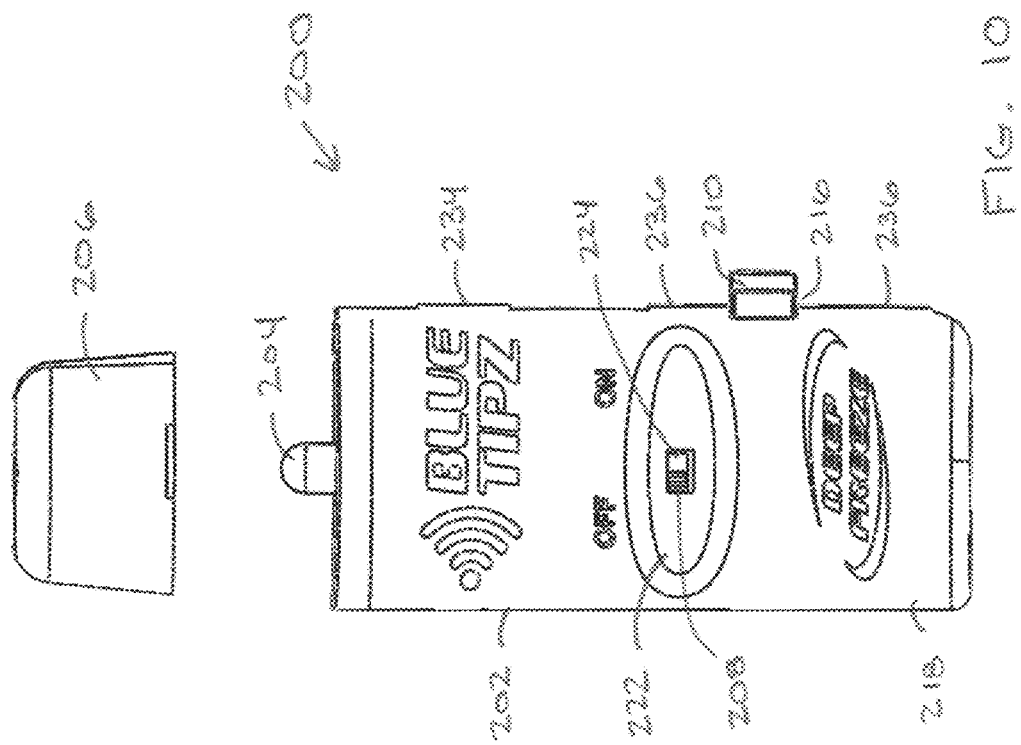
FIG. 10 shows an exploded front elevation view of the fish strike indicating device shown in FIG. 3.
Figure 11:
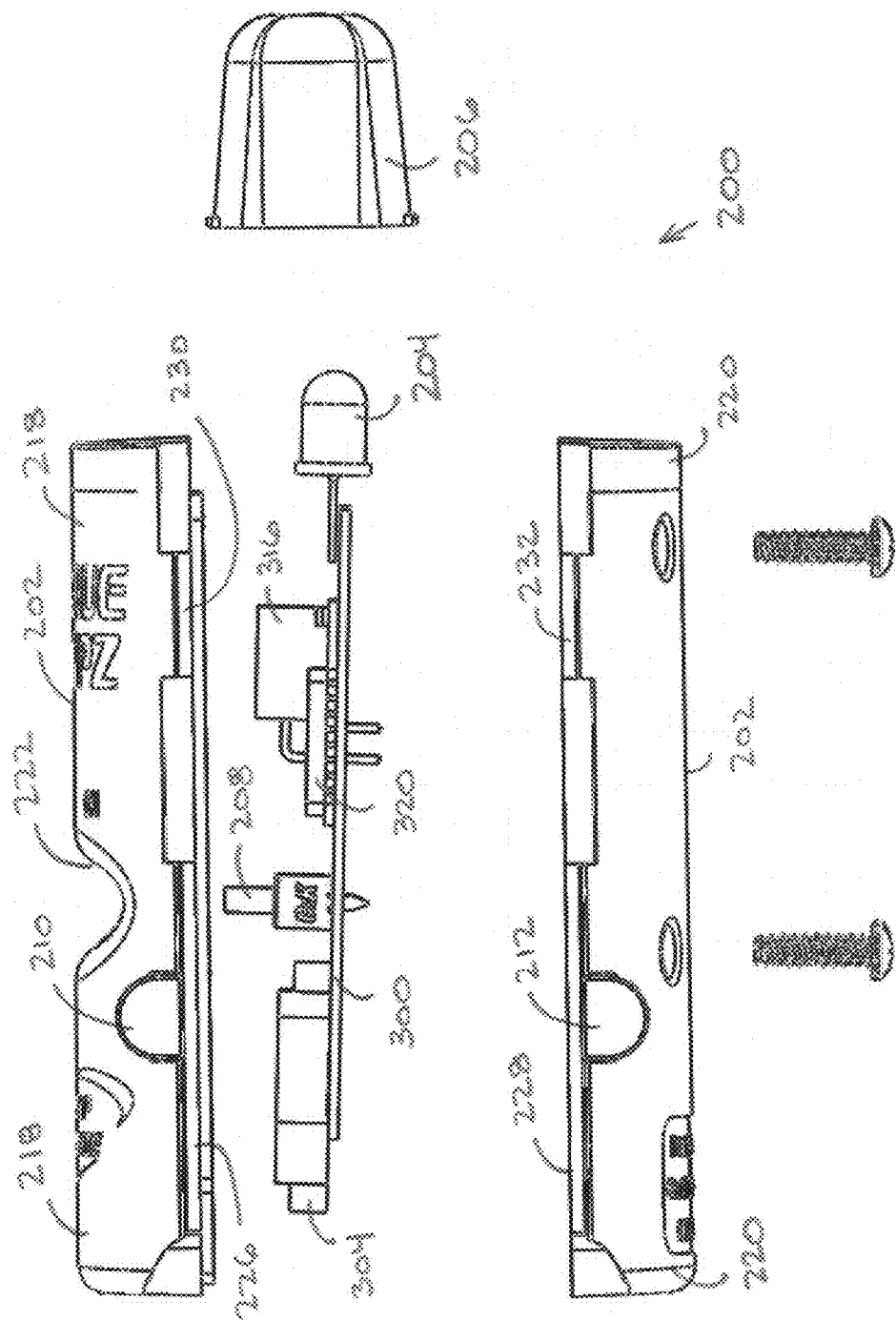
FIG. 11 shows an exploded right side elevation view of the fish strike indicating device shown in FIG. 3.
Figure 12:
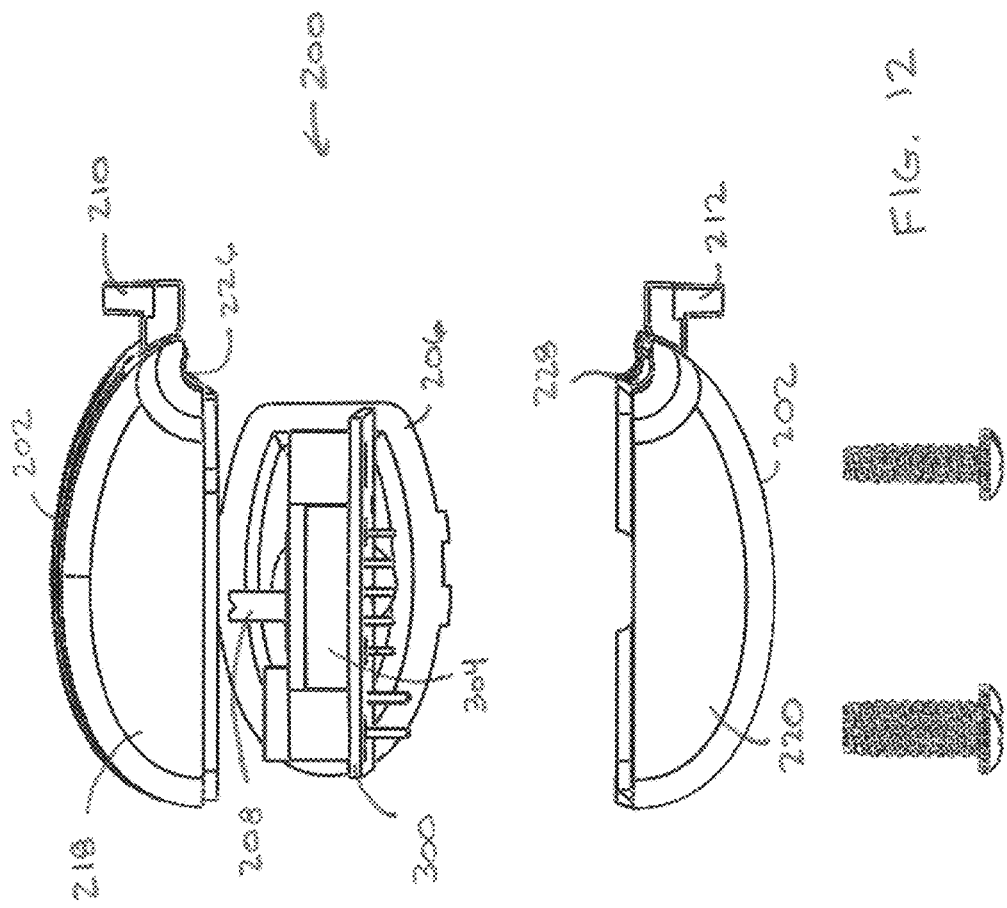
FIG. 12 shows an exploded bottom plan view of the fish strike indicating device shown in FIG. 3.
Figure 23:
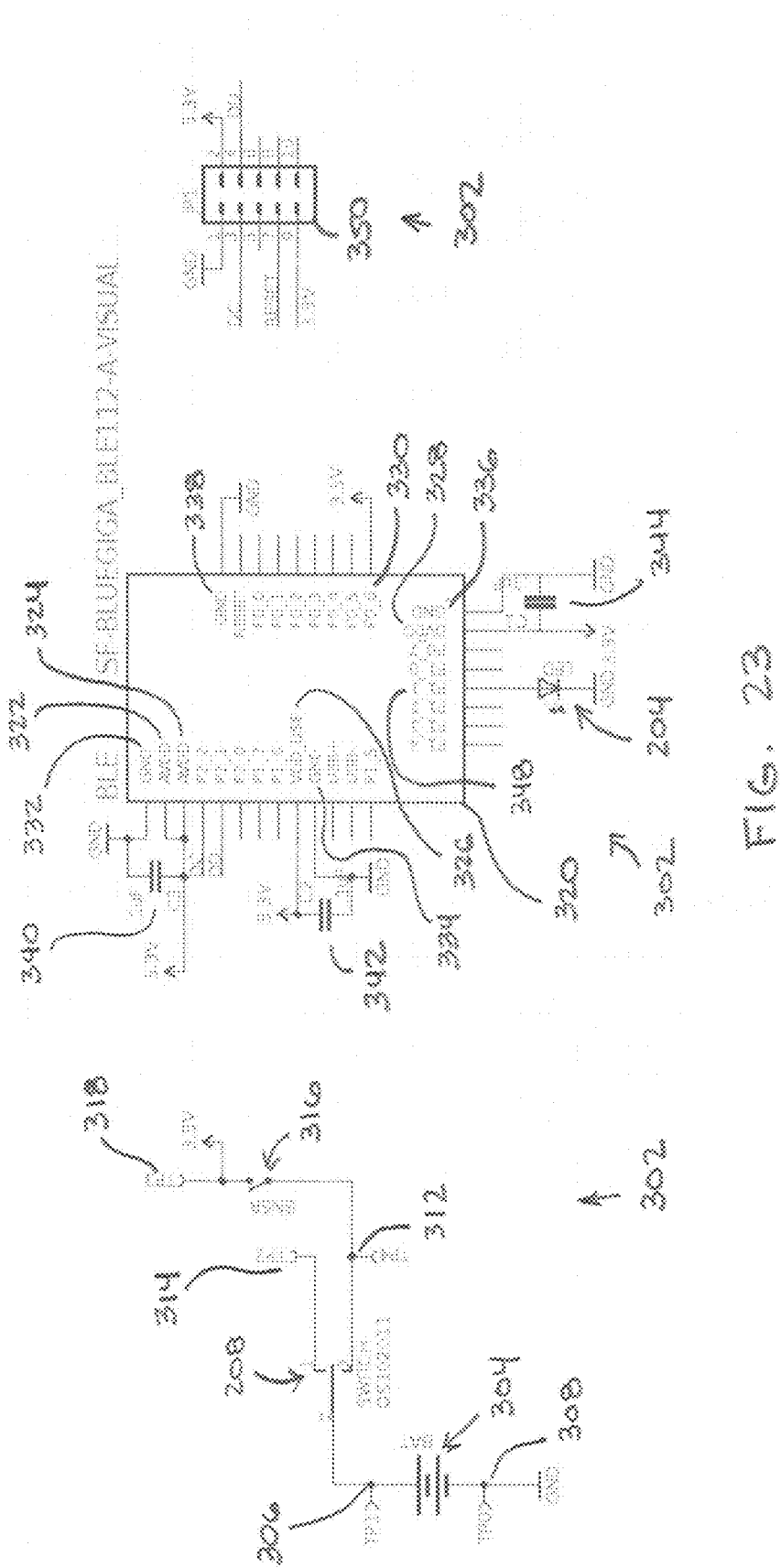
FIG. 23 shows an electrical schematic diagram of the circuitry for a fish strike indicating device in accordance with one embodiment of the present invention.

In addition to the components thus far described, fish strike indicator 200 also includes an internal circuit board 300 (see FIGS. 9, 11 and 12). FIG. 23 shows the electrical schematic diagram for electrical circuit 302 disposed on circuit board 300. As a starting point, circuit 302 is powered by a battery 304. Battery 304 is connected between the other components of circuit 302 and ground. Battery 304 in this embodiment is a lithium cell type battery such as, for example, a model CR2032 standard coin size lithium cell battery.

Lithium cell batteries of this type are ideal for use in cold temperatures because they have a large capacity for long life and the size of these batteries is ideal for allowing a user to easily replace the battery in cold temperatures. The lithium cell battery used in this embodiment has a nominal voltage of 3 volts, which is a desirable power source for circuit 302. Test points 306 and 308 are provided on either side of battery 304 in circuit 302 for use in testing and verifying the in-circuit battery voltage of battery 304.

It should be understood that the present invention is not limited to the use of lithium cell type batteries and in other embodiments of the present invention, other types of batteries are used. It should also be understood that the present invention is not necessarily limited to the use of batteries as a power source and in other embodiments of the present invention, other types of power sources are used.

An on/off switch 208 (the same on/off switch as shown in FIGS. 3 through 6) is located in series with battery 304 and is operated by the user to enable and disable circuit 302 and thereby turn fish strike indicator device 200 on and off. When in the "off" position, switch 208 is electrically open and no current passes from battery 304 through circuit 302. When in the "on" position, switch 208 is electrically closed and battery 304 is connected to the rest of circuit 302. A test point 312 is provided in circuit 302 on one side of switch 208 to verify that switch 208 is closed (e.g., in the "on" position) while a test point 314 is provided on the other side of switch 208 to verify if switch 208 is open (e.g., in the "off" position).

As previously discussed, when switch 208 is in the "on" position, switch 208 is electrically closed and battery 304 is connected to the rest of circuit 302. More specifically, when switch 208 is closed, the positive terminal of battery 304 is connected to one of the terminals of a rolling ball tilt switch or sensor 316. Rolling ball sensor 316 in this embodiment is a sensor having a small metal ball and two metal contacts.

When sensor 316 is physically positioned at an angle that is greater than 45 degrees from vertical in any direction around a vertical axis, the small rolling ball inside of sensor 316 moves out of contact with the two metal contacts inside of sensor 316 and sensor 316 is "inactive" with the circuit between the two terminals of sensor 316 being electrically an "open" circuit. When sensor 316 physically moves to a position that is at an angle of 45 degrees or less from vertical in any direction around a vertical axis, however, then the small rolling ball inside of sensor 316 moves into contact with the two metal contacts inside of sensor 316 to close and complete the electrical circuit between the two internal terminals of sensor 316.

Rolling ball sensor 316 is used in this embodiment to determine when fish strike indicator 200, which is mounted to flagpole 120 of tip-up device 100, moves from the horizontal or substantially horizontal "non-strike" indicating position to the vertical "strike" indicating position. When rolling ball sensor 316 is physically vertical, sensor 316 is "activated" and current can flow through sensor 316 to the rest of circuit 302. A test point 318 is provided to verify that switch 208 is closed (e.g., "on") and that rolling ball sensor 316 is activated (e.g., closed). Only when these two conditions are met will the rest of circuit 302 be "active" and draw current and power from battery 304. If either on/off switch 208, or sensor 316, or both, are open, then no power is provided to circuit 302 from battery 304 and no battery power is consumed. It should be noted that the term "active"

as used in this disclosure with respect to circuit 302 means that power has been supplied to a wireless communications and micro-controller/processor module in circuit 302 from battery 304 through switch 208 and sensor 316.

It should be understood that the present invention is not limited to the use of rolling ball sensors to detect the position and orientation of fish strike indicator 200 and in other embodiments, other types of sensors and switches are used. For example, in an alternative embodiment, an accelerometer or some other type of tilt switch is used instead of rolling ball sensor 316 to detect the physical orientation of fish strike indicator 200.

In addition to the components thus far described, circuit 302 also includes a programmable wireless communications and micro-controller/processor chip or module 320. Module 320 in this embodiment is a Bluetooth Low Energy (BT4.0) wireless transceiver module, product number BLE112-A, which is distributed by BlueGiga Technologies located in Duluth, Ga. Module 320 contains internally, among other things, a CC2540 micro-controller/processor, a chip antenna, volatile (e.g., transitory) flash memory storage, non-volatile (e.g. non transitory) permanent memory storage, an internal temperature sensor (thermistor), and various other internal circuitry components that taken all together enable module 320 and fish strike indicating device 200 to, among other things, transmit, receive and process wireless signals, information, data and commands.

Module 320 requires power and ground signals for its internal circuitry to operate. These signals are applied at the appropriate pins as shown in FIG. 23 to make module 320 work properly. More specifically, power to module 320 is provided from battery 304 through switch 208 and sensor 316 and to pins 322 and 324 (both labeled AVDD in FIG. 23), pin 326 (labeled VDD_USB in FIG. 23), pin 328 (labeled DVDD in FIG. 23) and pin 330 (labeled PO_6 in FIG. 23). Pins 332, 334, 336, and 338 (all of which are labeled GND in FIG. 23) are all connected directly to ground in circuit 302. Three 0.1 microfarad decoupling capacitors 340, 342 and 344 are provided, one of which is provided between pins 322 and 332, another of which is provided between pins 326 and 334 and the last of which is provided between pins 328 and 336.

Although it is desirable for module 320 to be powered by a 3.3 volt dc power source, module 320 is capable of functioning properly when powered by a voltage as low as 2.7 volts dc. As such, battery 304, which provides a nominal voltage of 3.0 volts dc, provides sufficient and adequate voltage to power module 320 in this embodiment.

In addition to power signals and ground, light emitting diode ("LED") light source 204 is also connected to module 320, namely at pin 348 (labeled P1_1 in FIG. 23). As previously mentioned, LED light source 204 in this embodiment is an amber LED specifically chosen for its brightness and operation in the current and voltage range supplied by module 320 at pin 348.

As previously mentioned, module 320 is programmable in this embodiment. This permits firmware to be written to control how module 320 and thereby fish strike indicator 200 communicate wirelessly (both as a transmitter and as a receiver) with other devices such as, for example, smart phones, tablet computers and other computing and communication devices. For example, in one embodiment of the present invention, the firmware programmed onto module 320 is configured to cause LED light source 204 to flash, and the wireless capability of module 320 to broadcast and/or receive data and signals, when power is supplied to module 320.

Finally, a programming header module 350 is provided on circuit board 300. Header module 350 provides exposed contacts on the back side of circuit board 300. Header module 350 allows a programming unit to connect and program the firmware onto module 320. The firmware is written to and stored in the non-volatile flash memory of module 320 and runs when power is supplied to module 320 from battery 304. Also within the internal non-volatile flash memory of module 320 are some variables which can be read from (e.g., via transmission from the fish strike indicating device) and written to (e.g., via transmission to the fish strike indicating device) module 320 by a user using, for example and without limitation, an application such as for example a software application operatively running on a smart phone or other computing or communication device (which receives and transmits information, data and/or commands from and to the fish strike indicating device). These variables include the following in one embodiment of the present invention:

(1) Name—Allows a user to program and store a nickname for the fish strike indicator device (and therefore the ice fishing tip-up to which it is attached) into and on the device.

(2) Owner—Allows for the name of the owner of the fish strike indicator device to be programmed into and stored on the device. This can be useful if a device is lost in that it may aid in having the lost device returned to its owner.

(3) Telephone number—Allows for the telephone number of the owner of the fish strike indicator device to be programmed into and stored on the device (4) Email Address—Allows for the e-mail address of the owner of the fish strike indicator device to be programmed into and stored on the device.

(5) Strike Count—Allows for an incrementing count of the number of times the fish strike indicator device has been activated (e.g, which presumably is the number of times that a fish has struck the tip-up to which the device is attached). This count allows the user to keep track of the number of fish they have caught.

(6) "Wiggle" Time Delay—Allows for a time delay to be programmed into the fish strike indicator device. This time delay is the amount of time that will pass between the time that power is first supplied to module 320 and module 320 begins transmitting wireless signals. This time delay is referred to herein as the "wiggle" time delay because it allows for the tip-up flagpole (and the attached fish strike indicator device) to reach a steady-state vertical strike indicating position after a fish has struck the tip-up before module 320 increments the fish count and begins transmitting a wireless signal. The "wiggle" time delay is set at 2 seconds in one embodiment of the present invention and is set at 0, 1, 3, 4, and 5 seconds in other embodiments. In yet other embodiments of the present invention, the "wiggle" time delay is set to some other time period.

(7) "Back-off" Time—Allows for the time between wireless transmissions to be programmed into and stored on the fish strike indicator device. More specifically, initially, following the "wiggle" time delay, module 320 will begin transmitting wireless signals at a rapid rate, for example, every 20 milliseconds in one embodiment. After the "back-off" time has been reached, module 320 will slow down and will only transmit wireless signals at a rate of one transmission every second in this embodiment. This feature can be helpful in conserving battery power. The "back-off" time delay is set at 60 seconds in one embodiment of the present invention and is set to other time periods in other embodiments of the present invention.

(8) "Shut-off" Time—Allows for the programming of an amount of time after which the fish strike indicator device will automatically turn itself off completely and cease to light or transmit any wireless signals. This feature is provided to further conserve battery life. The "shut-off" time delay is set at 10 minutes in one embodiment of the present invention and is set to other time periods in other embodiments of the present invention.

In another embodiment of the present invention, and in addition to the above described features and variables, there are several other pieces of information and data that are transmitted by module 320 but that are not writeable:

(1) Battery Life—This is the percentage of battery life that remains.

(2) Raw Battery Voltage—Module 320 has its own internal voltage reference. An analog to digital conversion ("ADC") can be performed on the actual in-circuit voltage of battery 304 and then that voltage can be compared to the internal reference voltage of module 320 to get a measurement of the actual battery voltage. This value can be transmitted from fish strike indicator 200 to, for example and without limitation, a software application operatively running on a smart phone or other suitable computing or communication device and can be used by the software application to calculate the remaining battery life of battery 304 in this embodiment.

(3) Temperature—Using the internal thermistor built into module 320, an ADC value can be read and translated into a temperature measurement. This information can also be transmitted from fish strike indicator 200 to, for example and without limitation, a software application operatively running on a smart phone or other suitable computing or communication device and can be used by the software application to calculate or determine the outside air temperature near and around fish strike indicator 200 in this embodiment.

(4) Raw Temperature Voltage—This is the ADC value that is read from the thermistor. This value can also be transmitted from fish strike indicator 200 to a software application operatively running on a smart phone and can be used by the software application to calculate or determine the outside air temperature near and around fish strike indicator 200 in this embodiment.

The firmware is stored as instructions in non-volatile memory of fish strike indicating device 200 (located on module 320 in this embodiment of the present invention) and when executed by fish strike indicating device 200 (via module 320 in this embodiment), causes fish strike indicating device 200 to communicate wirelessly (both as a transmitter and as a receiver) with other devices such as, for example, smart phones, tablet computers and other computing and communication devices, and to perform and execute the other features and functions discussed and described herein.

The operation of module 320 will now be described in more detail. When power is first supplied to module 320 from battery 304, module 320 configures light source 204 as an output, loads the flash data from its internal non-volatile permanent memory into its internal volatile flash memory, and initiates a read of the temperature inside of fish strike indicator 200 and the battery level of battery 304. Module 320 also starts an internal timer which is responsible for making light source 204 flash at regular intervals and for controlling the frequency rate of the wireless transmissions from fish strike indicator 200.

Upon being powered-up, the timer inside of module 320 first checks to see if it has been running for longer than the programmed "shut-off" time. If it has, then module 320 will be forced into a "sleep" mode whereby fish strike indicator 200 will stop transmitting wireless signals, light source 204 will turn off, and the timer inside of module 320 will stop running. If module 320 determines that its timer has been running for a period of time that is less than the "shut-off" time, then the timer will continue running and will continue making light source 204 flash on and off at regular intervals.

If module 320 determines that its timer has been running for a period of time that is greater than the "wiggle" time delay, then it will start the transmission of wireless communication packets. In Bluetooth Low Energy terms, module 320 sets itself to begin transmitting GAP_BROADCAST packets and it begins advertising itself as GAP_UNDIRECTED_CONNECTABLE, with an initial wireless transmission frequency rate of 20 milliseconds in this embodiment.

Module 320 will also increment the fish counter by one (e.g., presumably if power has started flowing to module 320, it is because there has been a fish strike), store and save the new fish count data to its internal permanent memory, and make the updated fish count data available as a data field that is readable by, for example and without limitation, a software application operatively running on a smart phone or other suitable computing or communication device.

When the timer inside of module 320 has been running for a period of time that is equal to the "back-off" time, the timer will reset its rate of wireless transmissions from 20 milliseconds to 1 second in this embodiment. In other embodiments of the present invention, different initial and reset rates of transmission are utilized.

During the time period in which the timer inside of module 320 is running, a user may establish a Bluetooth Low Energy connection with fish strike indicator 200 in one embodiment of the present invention using a smart phone or other suitable mobile computing or communication device that is capable of receiving and transmitting signals via a Bluetooth Low Energy connection. In this way, the user can read (receive) and write (transmit) data from and to fish strike indicator 200. When the data is written to fish strike indicator device 200, the firmware on module 320 validates the data and then saves the data to the internal permanent flash memory inside of module 320 in this embodiment.

Whenever a read is called on the battery level or the temperature, the analog-to-digital conversion module inside of module 320 measures the voltage and calls a function with the results. These results are then written to the data used for transmission both as raw values (e.g., voltage) and calculated values (e.g., % or C).

Figure 24:
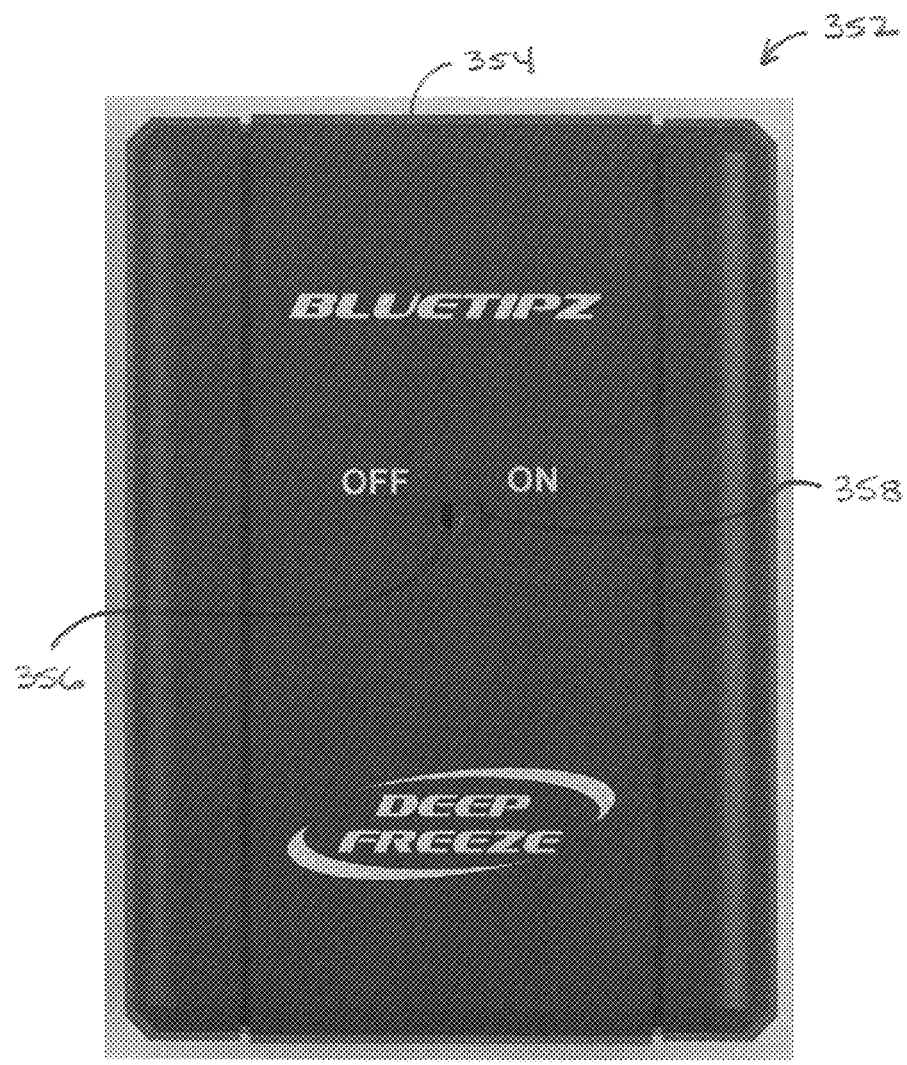
FIG. 24 shows a front elevation view of a transceiver/repeater/booster device in accordance with one embodiment of the present invention.

When a user disconnects from communicating with fish strike indicator device 200 in this embodiment, the device resumes broadcasting and is available for a wireless connection with another fisherman or user In addition to fish strike indicator 200, the present invention also includes transceiver/repeater/booster 352 in one embodiment (see FIG. 24). As previously mentioned, transceiver 352 has the capability to both receive wireless communication signals and to boost and re-transmit received wireless communication signals in this embodiment.

Transceiver 352 is configured to electronically communicate with fish strike indicator 200. More specifically, transceiver 352 can receive a wireless communication signal from a nearby and remotely located fish strike indicator 200, boost the power level of that signal, and then re-broadcast or re-transmit the boosted wireless signal out to nearby and remotely located fishermen (and likewise their mobile computing or communication devices) that, but for the transceiver, would not be able to receive the wireless signal directly from fish strike indicator 200.

As shown in FIG. 24, transceiver 352 includes an enclosure or housing 354 and a three-position on/off switch 356. Switch 356 extends outward from enclosure 354 through and opening 358 in enclosure 352 for easy access by the fishermen and other users. Switch 356 enables and disables transceiver 352 (e.g., turns transceiver 352 "on" and "off").

Switch 356 is mounted on a circuit board housed inside of enclosure 354. Also mounted on this circuit board and electrically connected to switch 356 and to each other are a buzzer, a light source, a wireless communications module, a micro-controller/processor, and a battery. The battery is provided to supply power to transceiver 352. Housing 354 includes an opening (not shown) through which the light source extends outward in one embodiment, or through which light from the light source can be emitted in another embodiment.

The wireless communications module contained in transceiver 352 in this embodiment of the present invention is identical to module 320 in fish strike indicator 200. More specifically, the wireless communications module contained in transceiver 352 is a Bluetooth Low Energy (BT4.0) wireless module, product number BLE112-A.

As previously mentioned, switch 356 is a three position switch in this embodiment. One of the positions is considered to be the "off" position (the left-most position in FIG. 24) while the other two positions are both considered to be "on" positions (the center and right-most positions in FIG. 24). When switch 356 is in the "off" position, transceiver 352 is disabled and is not capable of receiving or re-transmitting any wireless communication signals in this embodiment. The light source is also off and can not light-up when switch 356 is in the "off" position.

When switch 356 is in either of the "on" positions, transreceiver 352 is active and is capable of receiving and re-transmitting wireless communication signals. More specifically, when switch 356 is turned to one of the "on" positions, transceiver 352 immediately enters a "listening mode" and begins listening for any wireless communication signals being transmitted by a fish strike indicator 200.

When switch 356 is physically in the right-most "on" position, transceiver 352 is in the "loud" mode. In the loud mode, transceiver 352 begins to buzz and light-up immediately upon receiving a wireless communication signal from a fish strike indicator 200. The buzzing and lighting-up of transceiver 352 provides an immediate indication and notification to a fisherman or other user that a fish strike may have occurred at fish strike indicator 200. When switch 356 is physically in the center "on" position, transceiver 352 is in the "silent" mode. Transceiver 352 does not buzz or light-up upon receiving a wireless communication signal from fish strike indicator 200 when it is in the silent mode.

In both the "loud" and "silent" modes, transceiver 352, upon receiving a wireless signal from a fish strike indicator, will boost the signal and re-broadcast or re-transmit the signal to locations (and remote devices such as mobile devices) that might not normally be within the range of the fish strike indicator itself. In this way, transceiver 352 allows for the enhanced reception of wireless signals from fish strike indicators that are located far away, remotely, or that may be shielded such as behind metal ice fishing shacks or shanties.

It should be noted that transceiver 352 in this embodiment has the capability to receive wireless signals from multiple fish strike indicators 200, all at the same time, and has the capability to boost and re-transmit those multiple signals.

In addition, in other embodiments of the present invention, multiple transceivers 352 are provided. Each of the transceivers 352 has the capability to receive and re-transmit wireless signals from both fish strike indicators 200 and other transceivers 352. In this way, the communication range of a fish strike indicator can be enhanced even further.

Fish strike indicator 200 and transceiver 352 communicate remotely with each other using a wireless communication protocol in one embodiment of the present invention. As previously alluded to, the wireless protocol used in this embodiment is also used by smart phones and other mobile computing and communication devices that are capable of communicating using Bluetooth Low Energy (4.0). As a result, smart phones and many other computing and communication devices can receive indications and notifications of a fish strike at fish strike indicator 200 in this embodiment.

The indications or notifications are typically provided to the fisherman or user using an application such as, for example, a software application or program that is operatively disposed and running on a smart phone or other computing or communication device. The application is stored as instructions in the non-volatile memory of the smart phone or other computing or communication device and when executed, cause the application (and likewise the smart phone or other computing or communication device) to communicate wirelessly (both as a transmitter and as a receiver) with fish strike indicating device 200, and to perform and execute the other features and functions discussed and described herein.

Depending on the features and functions of the particular application being used, the smart phone or other computing or communication device can alert the user that a fish strike has occurred by making various sounds, by lighting-up, by buzzing or vibrating, by displaying information and/or data pertaining to the fish strike, or by providing the user with an audio or text message.

In other embodiments of the present invention, the application operatively running on the communication device includes features and functions that permit the device to communicate with both fish strike indicator 200 as well as with transceiver 352. For example, in one embodiment, a software application communicates with fish strike indicator 200 to set configuration parameters on fish strike indicator 200 or to receive data from fish strike indicator 200. In other embodiments of the present invention, the software application includes one or more of the following features and functions:

(1) Users can configure the software application to listen for signals from only a select group of fish strike indicators within the device's operating range, or it can be set to listen for signals from all fish strike indicators within its operating range (2) Users can configure the software application to store the identification information of only specific fish strike indicators and then have the mobile device respond to alerts and notifications from only those specific fish strike indicators, or the software application can be configured to respond to signals from all fish strike indicators located within the device's scanning or operating range;

(3) Users can also configure the software application to maintain a history of events, such as for example, the occurrence of fish strikes and catches. The user can then supplement this history by manually entering details about the event including, without limitation, information concerning the length, weight and species of the fish, a photograph of the fish, and weather and bait information relating to the strike or catch.

(4) Users can also configure the software application to allow for manual entry of information and data concerning fish strikes and catches.

(5) Users can also configure the software application to permit the sharing of information concerning fish strike and catches using web-based services and application such as, for example, various services such as social media sites and networks.

Each of these features and functions will be described in more detail below. As mentioned above, fish strike indicator 200 is configured to communicate and interface with an application such as, for example, a software application that operates on a computing or communication device such as, for example, a smart phone or tablet computer in one embodiment of the present invention. The features and functionality of one such software application 400 is described in FIGS. 25 through 39. It should be understood that the present invention is not limited to applications having only these features and functions. In other embodiments of the present invention, applications are provided that have only some of these features and functions, that have none of these features and functions, that include features and functions that are different from these features and functions, and/or that have features and functions that are in addition to these features and functions.

Software application 400 is configured to run on an "iPhone" smart phone running the Apple "iOS7" operating system in this embodiment of the present invention. In other embodiments, however, software application 400 is configured to run on other computing or communication devices and in connection with other operating systems. Software application 400 is also configured in this embodiment to run in the background on the smart phone. In this way, the user can use the smart phone to do other things and perform other tasks in the foreground on the phone while at the same time receiving alerts and notifications in real-time when a fish strike occurs.

Figure 25:
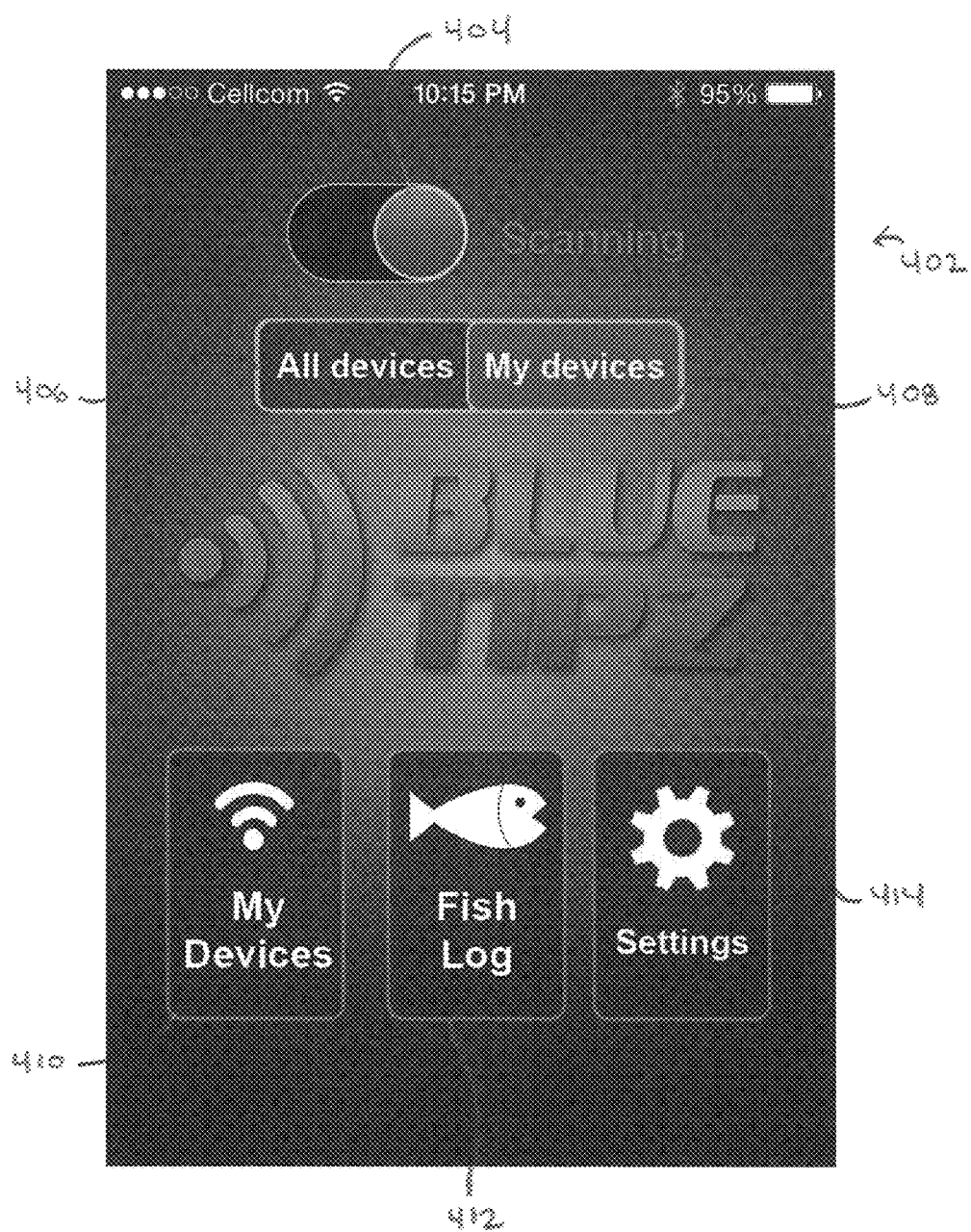
FIG. 25 shows a screen shot of the home screen of a smart phone software application in accordance with one embodiment of the present invention.
Figure 26:
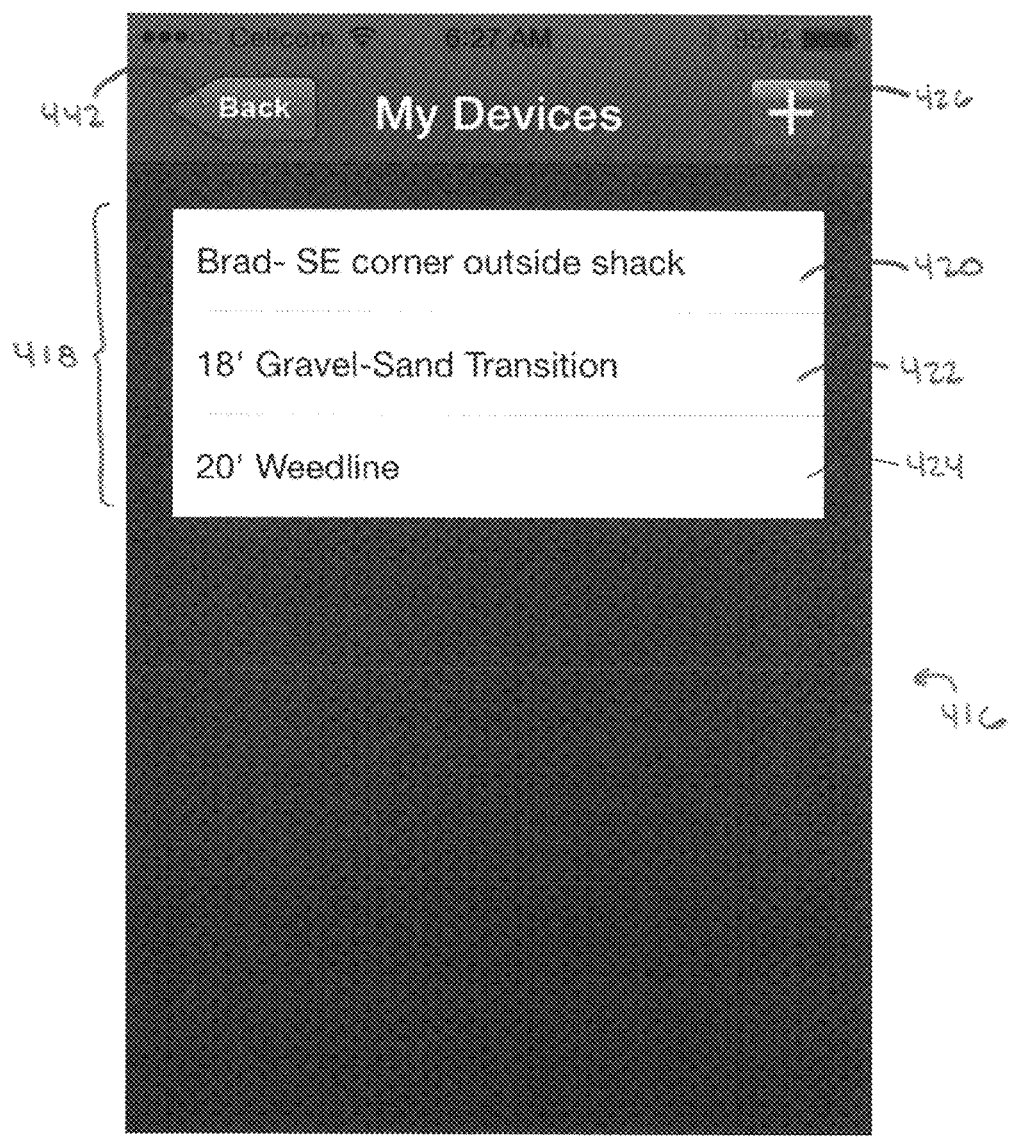
FIG. 26 shows a screen shot of the "My Devices" screen which is displayed and used as part of the software application of FIG. 25.

FIG. 25 shows a screen shot of the home screen 402 of software application 400. Software application 400 enables the smart phone on which the application is installed and running to wirelessly scan for fish strike indicators 200 that are within the scanning or operating range of the smart phone. Home screen 402 includes an on/off toggle switch 404 that allows the user to turn the scanning feature on or off.

Home screen 402 also includes two icons 406, 408 that permit the user to choose between two different scanning modes, namely, a "My devices" scanning mode and an "All devices" scanning mode. Choosing icon 408 labeled "My devices" allows the user to scan for only those fish strike indicators (and tip-ups) that are within the scanning or operating range of the smart phone and which the user has saved in the user's "My Devices" library which is part of software application 400 (saving devices to the "My Devices" library in this embodiment will be more fully described below).

Alternatively, choosing icon 406 labeled "All devices" allows the user to scan for all fish strike indicators and tip-ups that are within the scanning or operating range of the smart phone. In the "All devices" scanning mode, fish strike indicators that are saved within the user's "My Devices" library will be identified to the user by the name that was given to the device when it was saved to the "My Devices" library. All other fish strike indicators will simply be identified to the user as being an "unknown device."

Home Screen 402 also includes three navigation icons which can be selected by the user. The first of these icons 410 is labeled "My Devices" and takes the user to the "My Devices" section of software application 400. The second of these icons 412 is labeled "Fish Log." Tapping on this icon takes the user to the "Fish Log" section of software application 400. The third of these icons 414 is labeled "Settings." Tapping on this icon takes the user to the "Settings" section of software application 400. Navigation through software application 400 using each of these icons will be described in more detail below.

We begin our discussion with the "My Devices" section of software application 400. Tapping on "My Devices" icon 410 takes the user to "My Devices" screen 416 shown in FIG. 26. Screen 416 shows a table 418 of all of the fish strike indicators 200 that are both saved in the user's "My Devices" library and that are currently being monitored by software application 400 (e.g., these devices were identified during scanning by software application 400). In this particular case, for example, three of the fish strike indicators contained in the user's "My Devices" library were identified during scanning (e.g., were in the scanning range of the smart phone) and are being monitored. Those devices are named "Brad-SE corner outside shack" (device 420), "18' Gravel-Sand transition" (device 422), and "20' Weedline" (device 424). There is no limit to the number of fish strike indicator devices that a user can monitor using software application 400 in this embodiment of the present invention.

Figure 27:
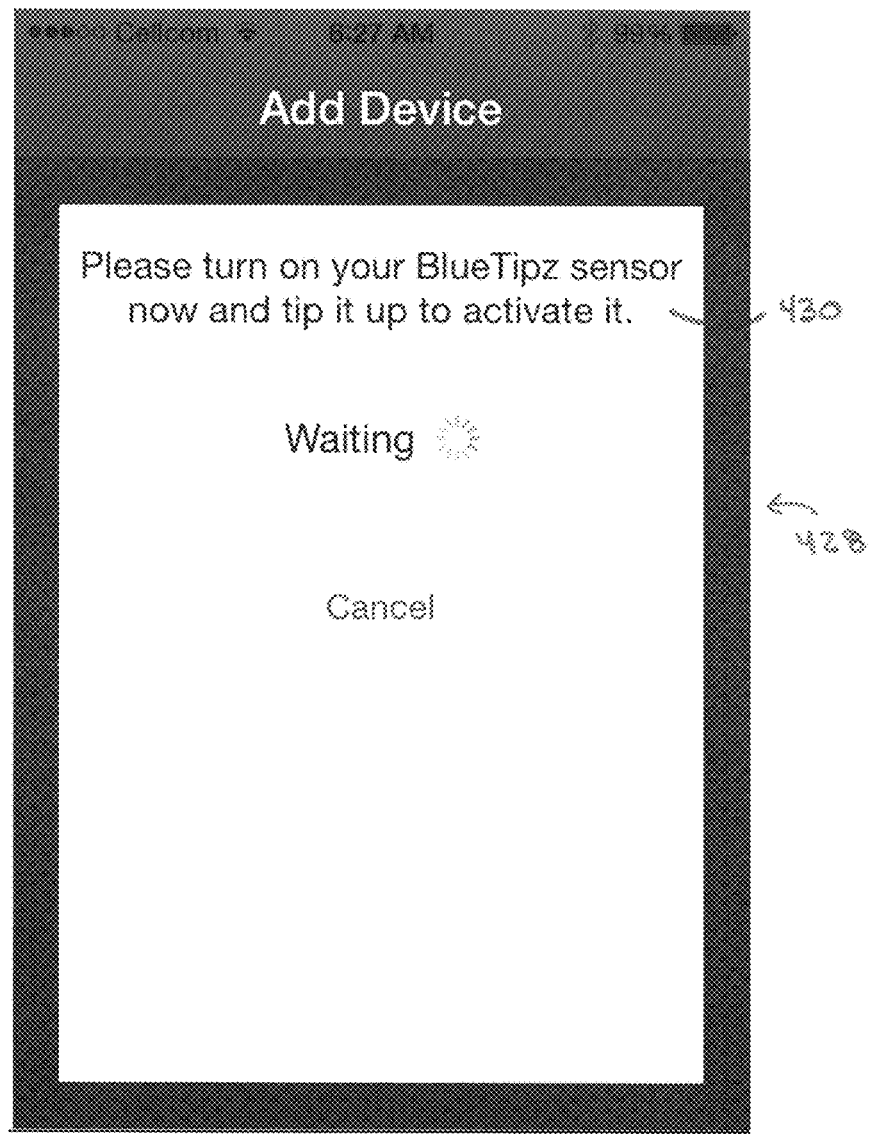
FIG. 27 shows a screen shot of a first "Add Device" screen which is displayed and used as part of the software application of FIG. 25.

The user can add a fish strike indicator to his or her "My Devices" library by simply tapping on "plus sign" icon 426 shown in the upper right-hand corner of screen 416. Tapping on icon 426 takes the user to "Add Device" display screen 428 shown in FIG. 27. Add Device screen 428 allows the user to add fish strike indicator devices 200 to the user's "My Devices" library. As can be seen in FIG. 27, display screen 428 provides message 430 to the user which reads "Please turn on your BlueTipz sensor now and tip it up to activate it." In response to message 430, and to add a fish strike indicator, the user simply activates the fish strike indicator device (e.g., by turning the on/off switch on the fish strike indicator to the "on" position and then holding the device in an upward position so that the rolling ball sensor closes) within the scanning range of the smart phone or other device on which software application 400 is running.

Figure 28:
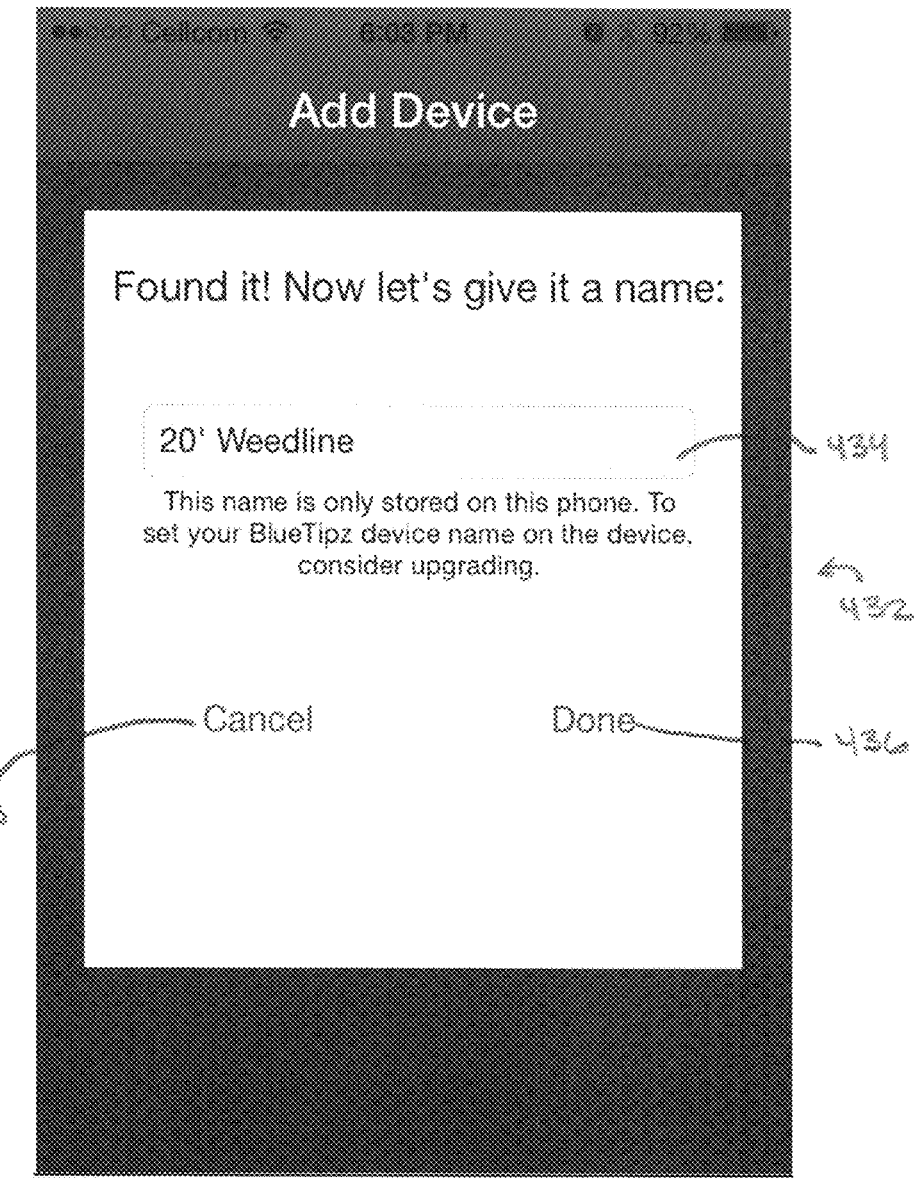
FIG. 28 shows a screen shot of a second "Add Device" screen which is displayed and used as part of the software application of FIG. 25.
Figure 29:
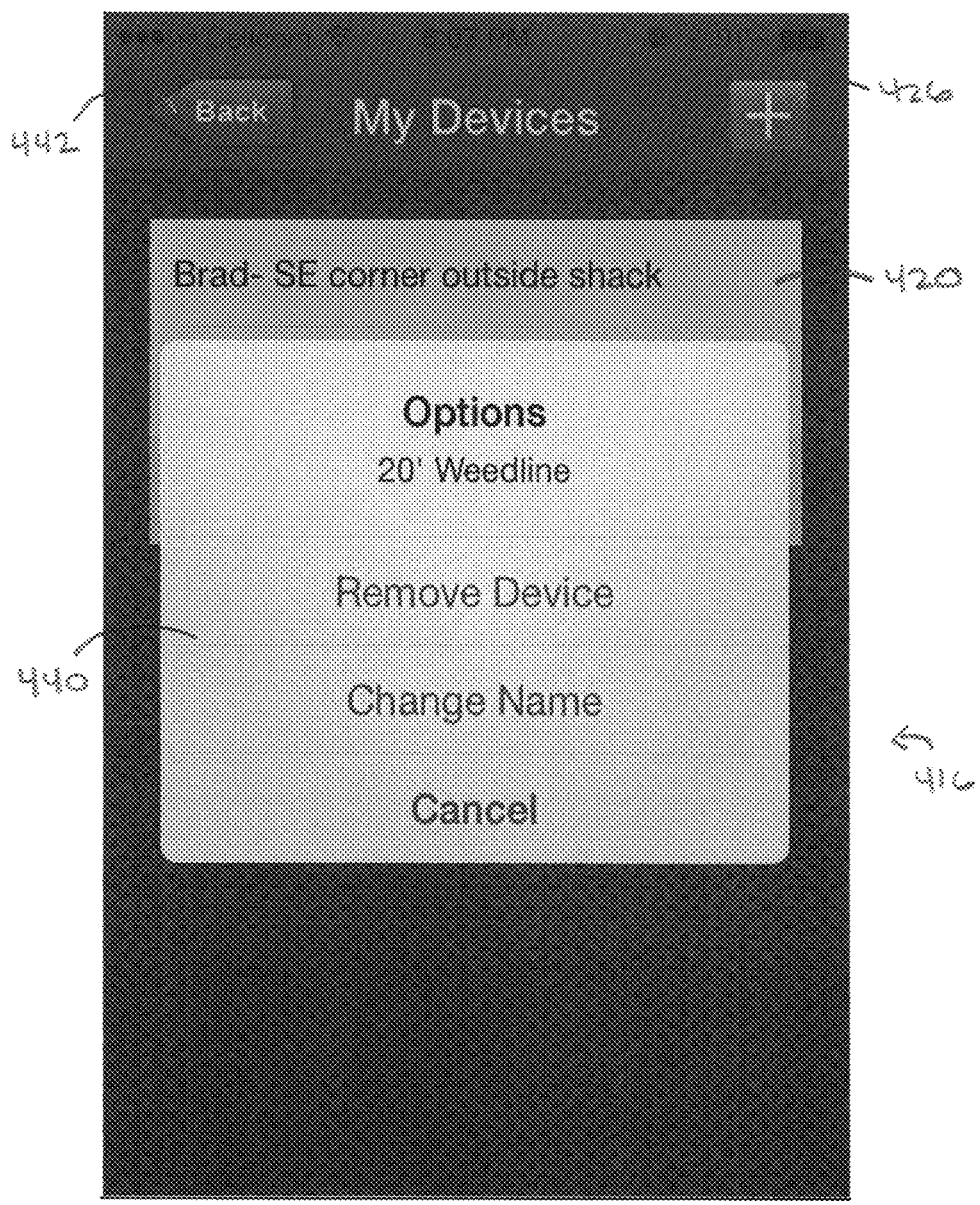
FIG. 29 shows a screen shot of the "My Devices" screen shown in FIG. 26 with an open drop-down menu displayed.
Figure 30:
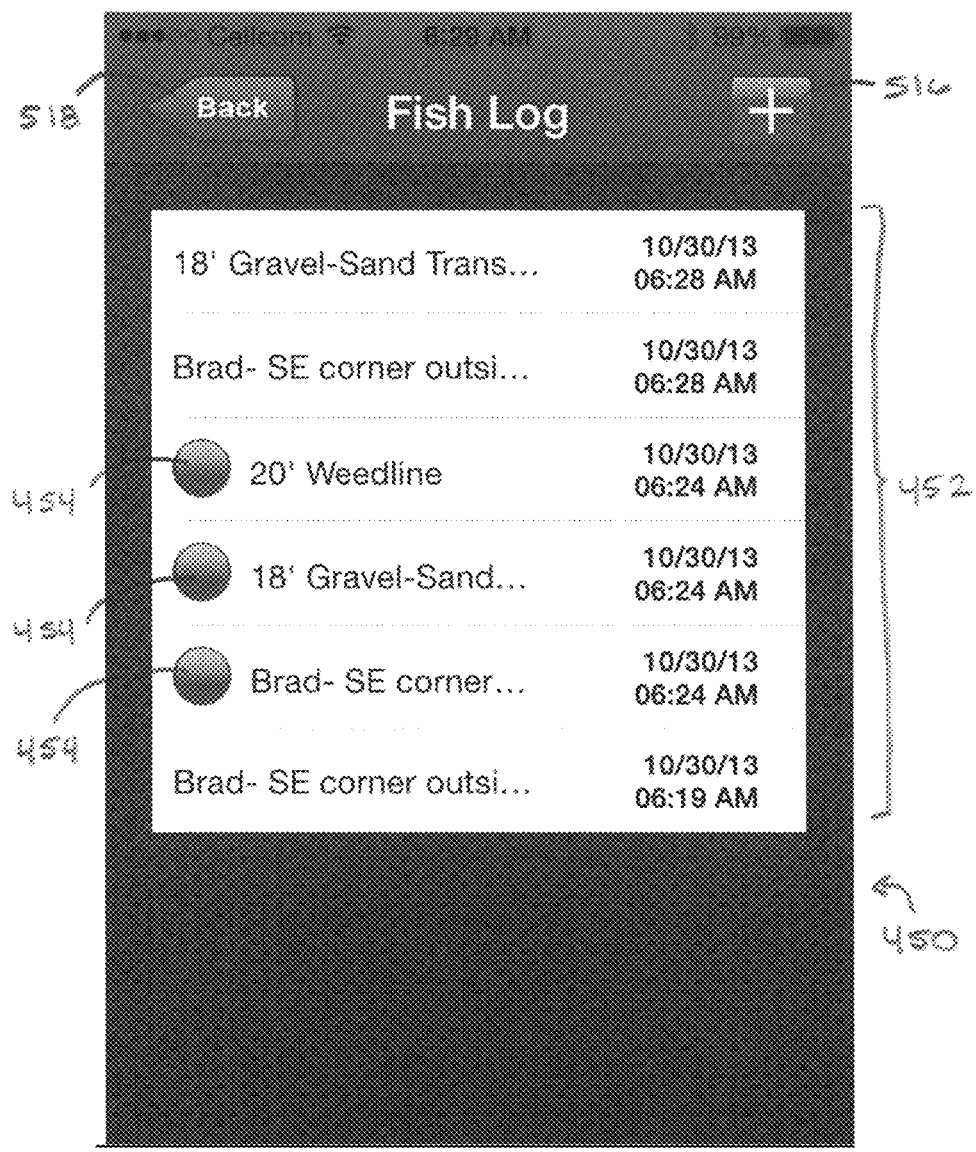
FIG. 30 shows a screen shot of the main "Fish Log" screen which is displayed and used as part of the software application of FIG. 25.

Once software application 400 has detected the new fish strike indicator, the user is presented with screen 432 shown in FIG. 28. Screen 432 includes field 434 in which the user enters the name of the newly detected fish strike indicator. The user then has the option to tap on "Done" icon 436 or "Cancel icon 438. Tapping on "Done" icon 436 saves the newly detected device into the user's "My Devices" library and returns the user to screen 416 (see FIG. 26) where the newly added device now appears as one of the devices identified in table 418. Alternatively, the user can tap on "Cancel" icon 438 which results in the newly detected fish strike indicator not being saved in the user's "My Devices" library. Tapping on icon 438 also returns the user to screen 416.

It should be noted that in the embodiment of the present invention shown in the figures, the name of the newly detected fish strike indicator device is only saved in the "My Devices" library on the smart phone and is not transmitted to the fish strike indicator itself. In an alternative embodiment of the present invention, the newly chosen name is transmitted to the fish strike indicator from software application 400 and as a result, is saved both in the "My Devices" library on the smart phone as well as in the permanent flash memory of the fish strike indicator device itself.

Software application 400 also provides the user with the ability to remove a fish strike indicator device from the user's "My Devices" library or to change the name of a device already listed in the user's "My Devices" library. To do either of these things, the user simply taps on the name of the device in table 418 on screen 416 and the user is presented with a drop-down menu of choices 440 (see FIG. 29). The user can then choose to remove the device from the library, change the name of the device as it appears in the library, or cancel out and return to screen 416.

Finally, when the user has completed reviewing and/or making changes to his or her "My Devices" library, the user simply taps on "Back" button 442 located in the upper left-hand corner of screen 416 and the user is returned to home screen 402 (see FIG. 25).

From home screen 402, the user also has the option to access the "Fish Log" portion of software application 400. To do this, the user simply taps on "Fish Log" icon 412 on home screen 402 which takes the user to the main "Fish Log" screen 450 shown in FIG. 30. Screen 450 contains a table 452 of all of the fish strike indicator devices that have experienced a fish strike (e.g., that have been triggered by a fish strike) along with any other fish strikes that have occurred and which have been manually entered by the user (e.g., for example, a fish strike that occurs at a tip-up that does not have a fish strike indicator device 200 attached to it).

Tapping on a fish strike listing in table 452 on main screen 450 provides the user with access to a series of additional screens within the "Fish Log" section of software application 400 relating to that listing. Each of these screens is shown in FIGS. 33 through 36 and will be described in more detail below.

Figure 31:
FIG. 31 shows a smart phone main menu desktop screen on which is displayed a desktop icon for the software application of FIG. 25.

A "blue dot" icon 454 is displayed next to the name of each fish strike listing in table 452 for which the user has not accessed the detailed screens shown in FIGS. 33 through 36. In addition to icons 454, software application 400 also notifies the user of the number of fish strikes for which the user has not accessed the detailed screens shown in FIGS. 33 through 36 by providing an icon 456 which overlays main software application 400 desktop icon 458 appearing on the smart phone main menu screen 460 as shown in FIG. 31.

Figure 32:
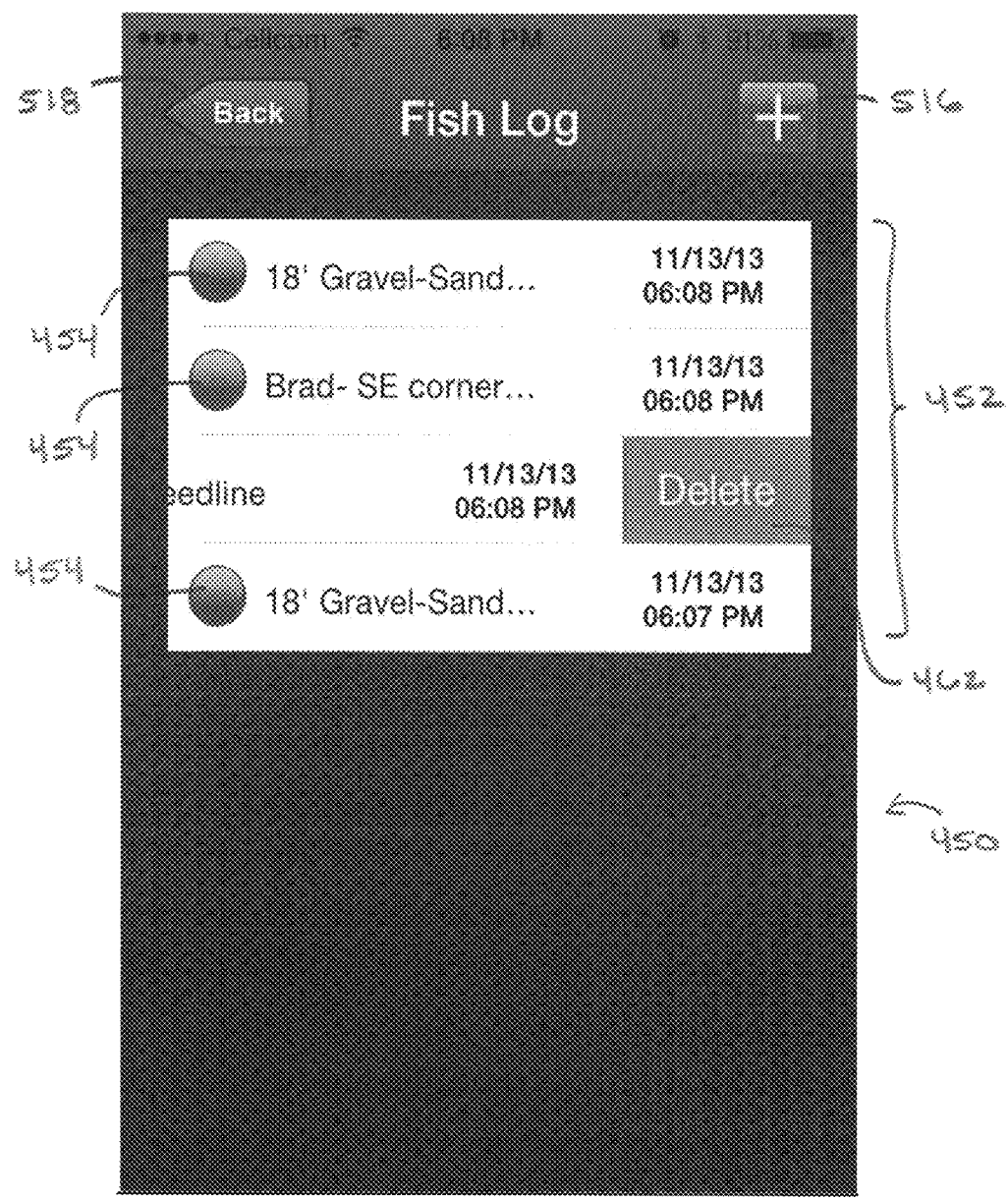
FIG. 32 shows a screen shot of the main "Fish Log" screen shown in FIG. 30 with the addition of a delete button.

Finally, if the user desires to delete a particular fish strike listing from table 452 on main screen 450, all the user has to do is swipe that listing to the left and a "Delete" button 462 will appear next to the name of the fish strike to be deleted (see FIG. 32). The user then simply taps on button 462 and the fish strike listing is deleted from table 452 on screen 450.

Figure 33:
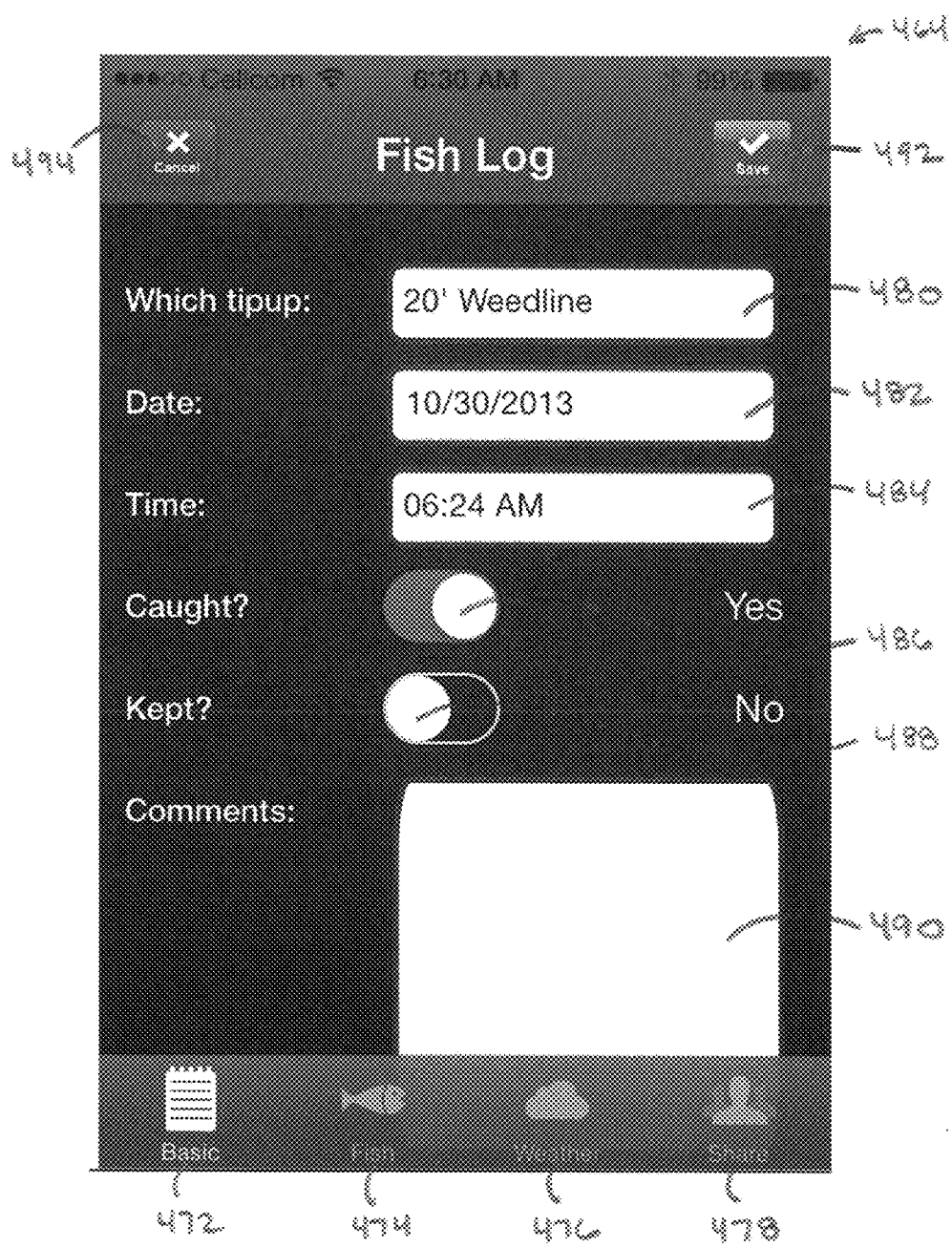
FIG. 33 shows a screen shot of the "Basic" screen from the "Fish Log" section of the software application of FIG. 25.
Figure 34:
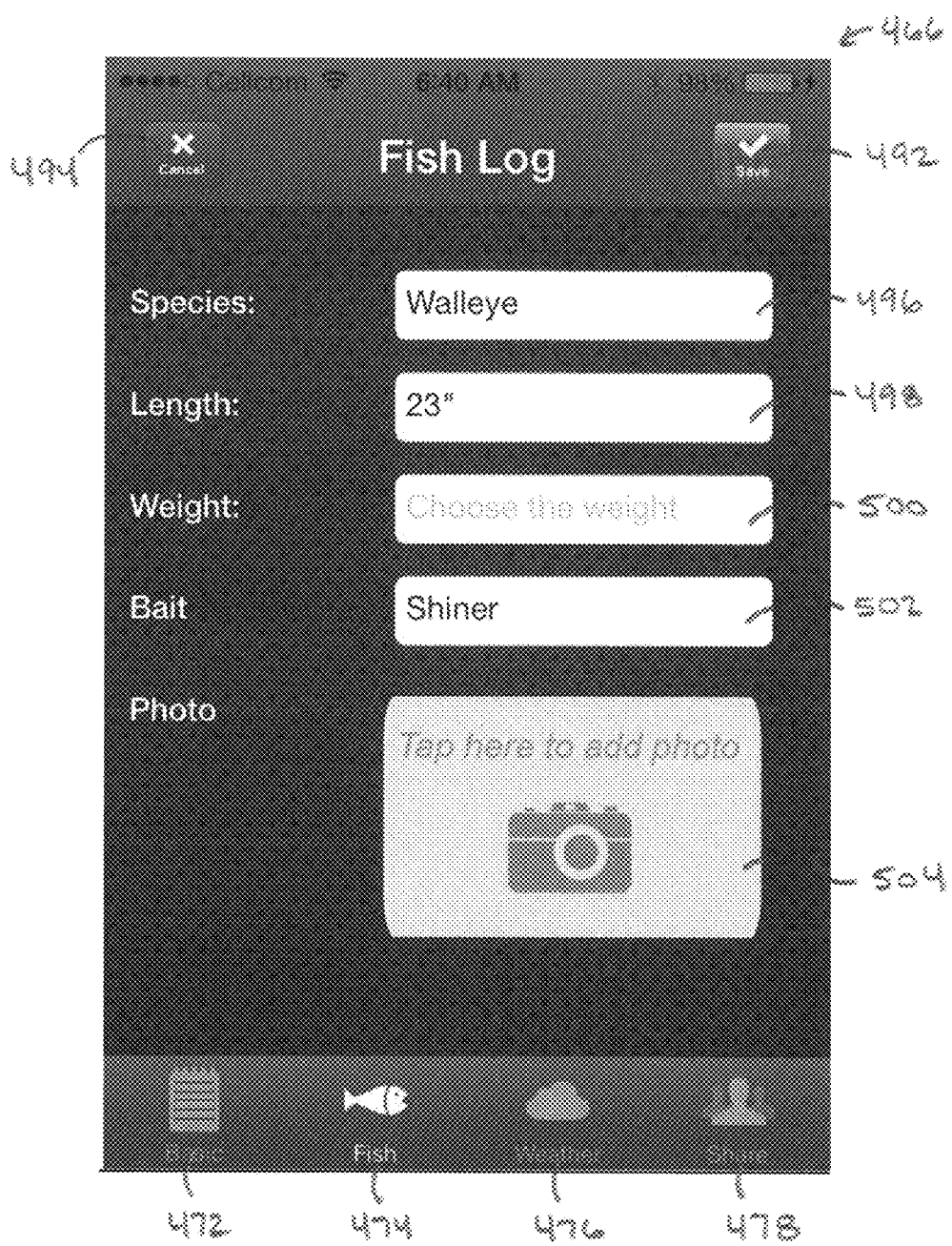
FIG. 34 shows a screen shot of the "Fish" screen from the "Fish Log" section of the software application of FIG. 25.
Figure 35:
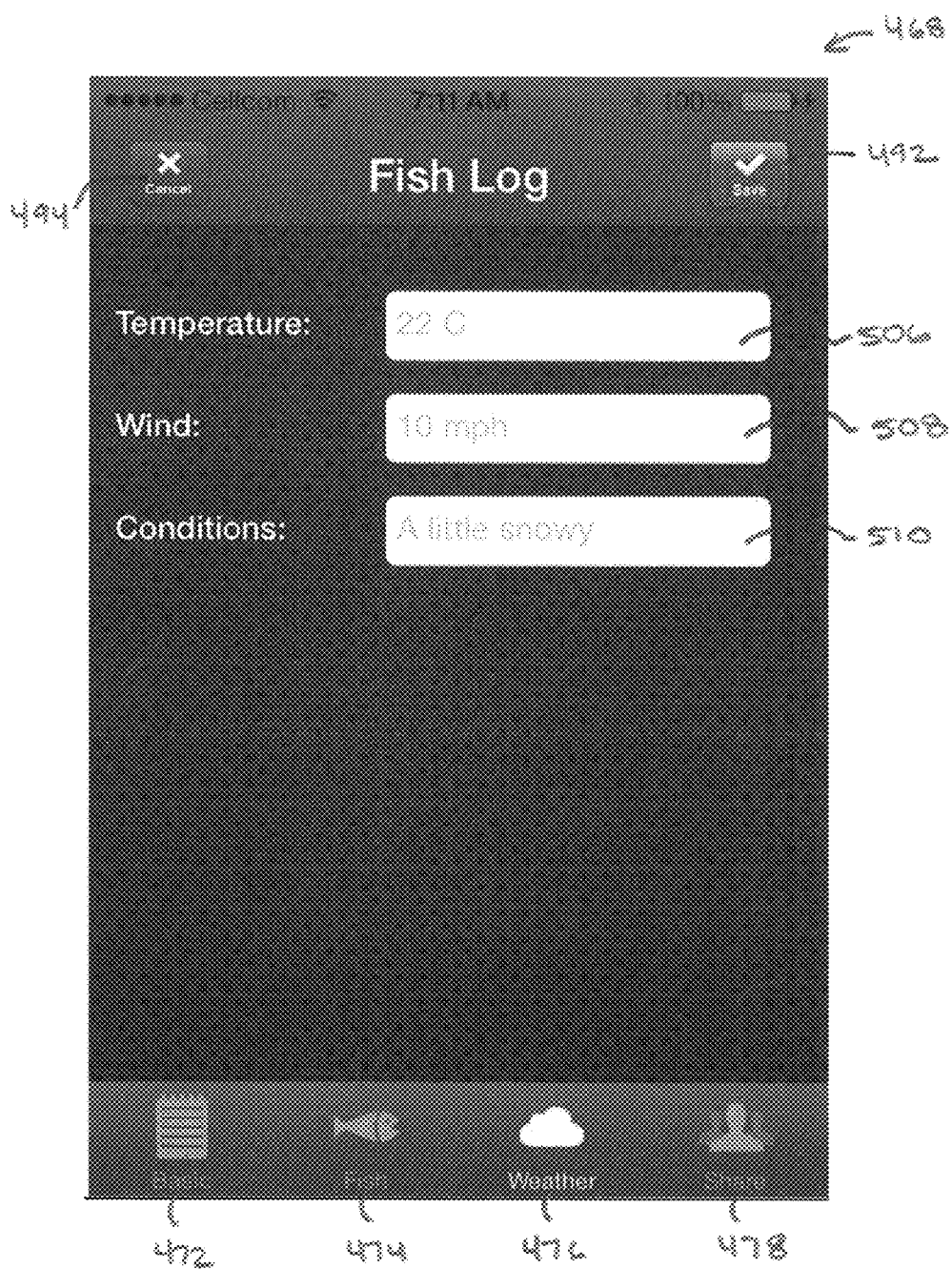
FIG. 35 shows a screen shot of the "Weather" screen from the "Fish Log" section of the software application of FIG. 25.
Figure 36:
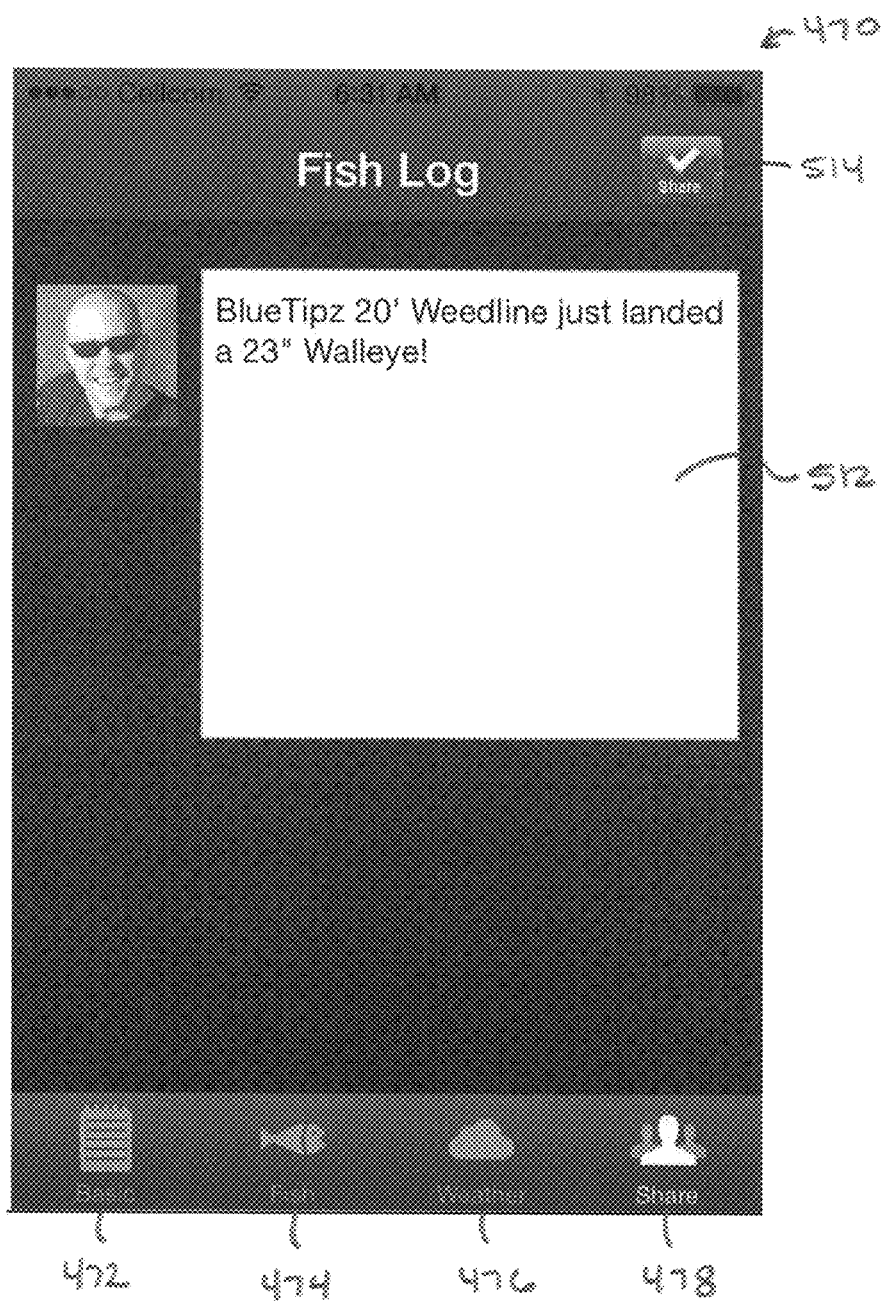
FIG. 36 shows a screen shot of the "Share" screen from the "Fish Log" section of the software application of FIG. 25.
Figure 37:
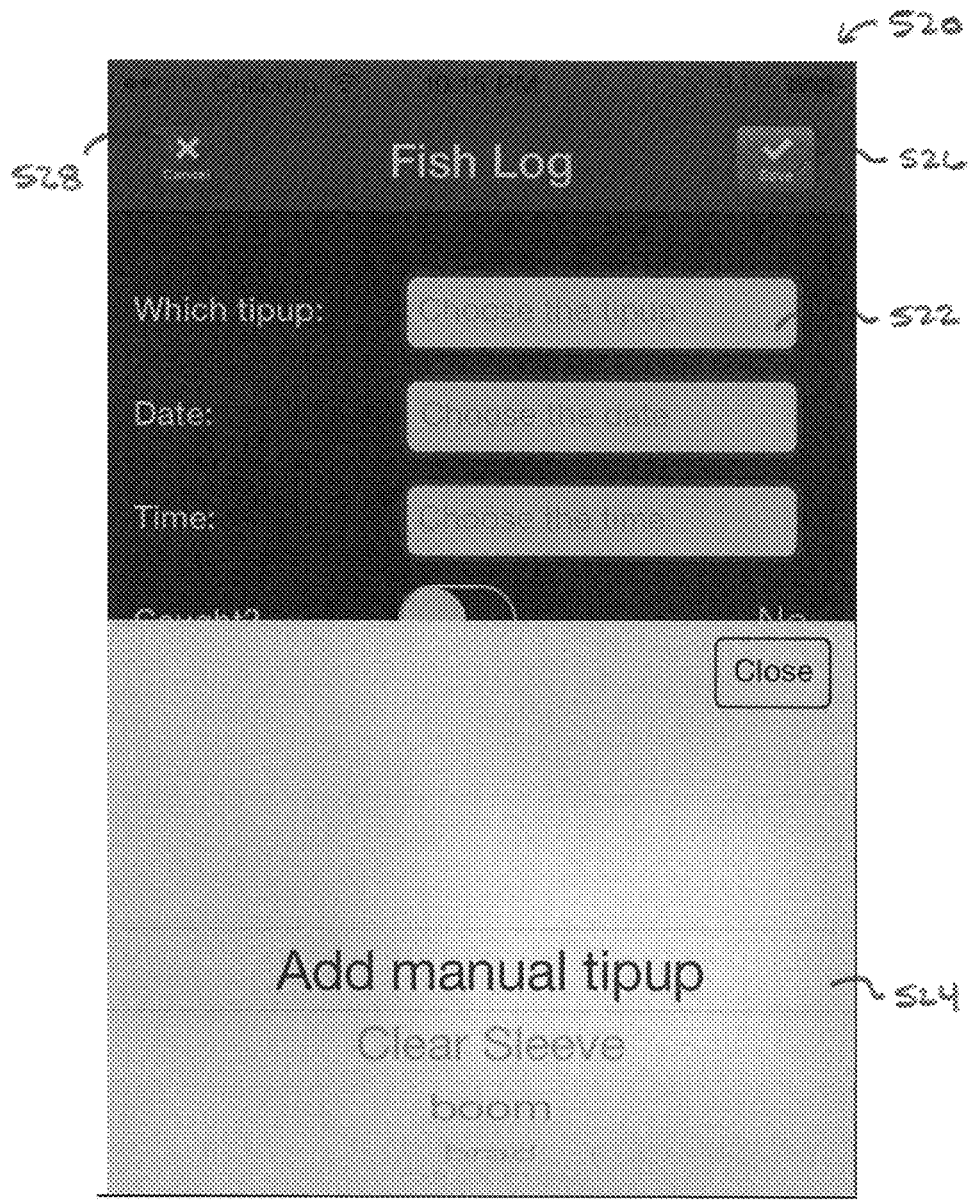
FIG. 37 shows a screen shot of the "Basic" screen shown in FIG. 33 with the "add manual tip-up" feature displayed.
Figure 38:
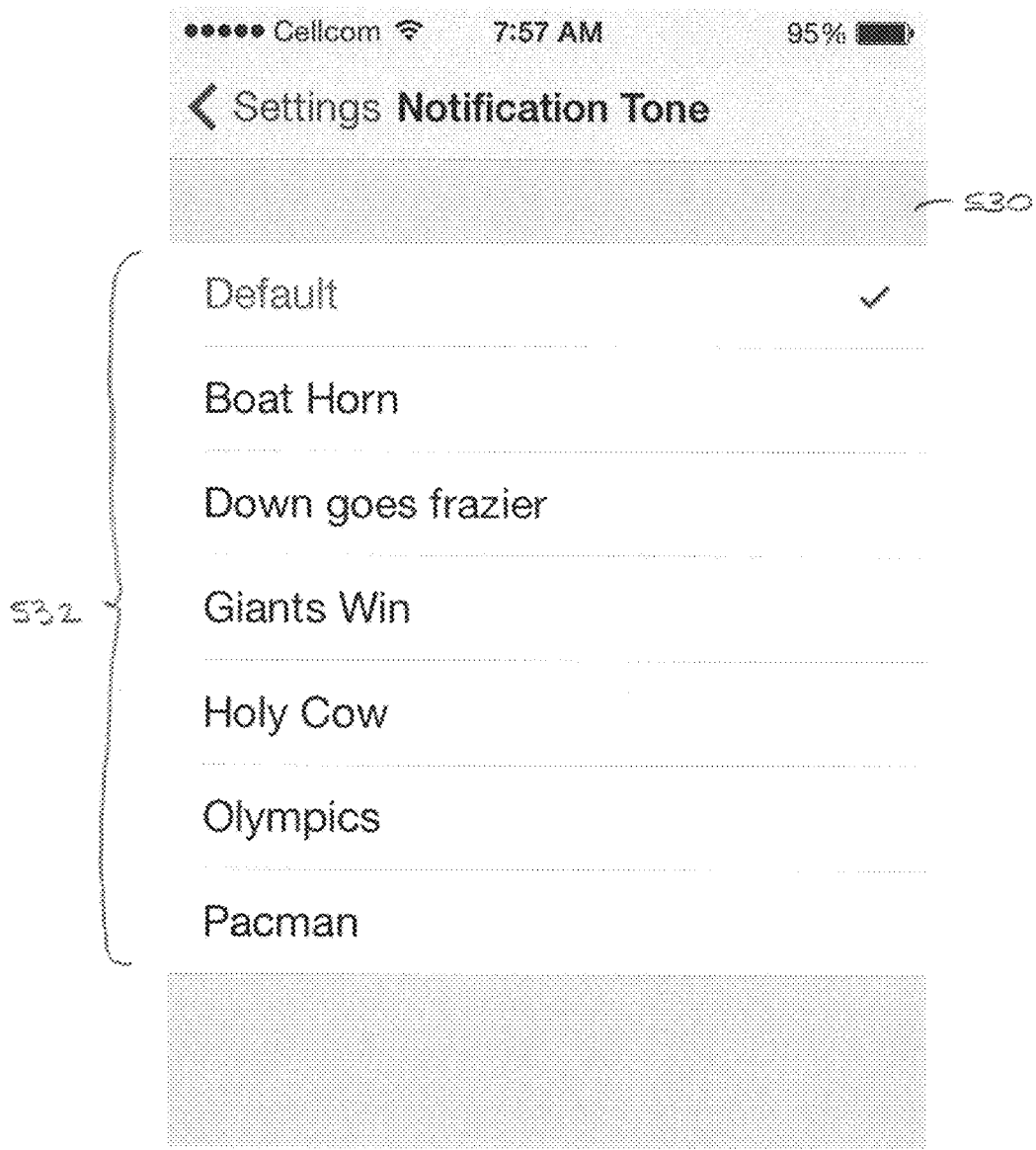
FIG. 38 shows a screen shot of the "Settings" screen which is displayed and used as part of the software application of FIG. 25.

As previously mentioned, selecting the name of a particular fish strike (e.g., by tapping on the name) listed in table 452 on main screen 450 provides the user with access to a series of additional screens inside of the "Fish Log" section of software application 400, all of which relate to the selected fish strike. Each of these screens is shown in FIGS. 33 through 36 and will be described in more detail below. For example, screen 464 shown in FIG. 33 is the "Basic" screen from the "Fish Log" section of software application 400. Similarly, "Fish" screen 466 from the "Fish Log" section is shown in FIG. 34, "Weather" screen 468 is shown in FIG. 35, and "Share" screen 470 is shown in FIG. 36. At the bottom of each of these screens are displayed navigation icons 472 (labeled "Basic"), 474 (labeled "Fish"), 476 (labeled "Weather"), and 478 (labeled "Share"). Each of these navigation icons allows the user to navigate back and forth between the various screens 464, 466, 468, and 470 while inside of the "Fish Log" section of software application 400.

We now turn our attention to a more detailed discussion of the various features available to a user in the "Fish Log" section of software application 400. When a user selects the name of a particular fish strike from table 452 on main screen 450 by tapping on the name, the user is immediately taken to "Basic" screen 464 shown in FIG. 33. Screen 464 provides numerous data fields that include information about the fish strike identified in table 452 on screen 450. Several of these data fields are automatically populated by software application 400. For example, data field 480 identifies the name of the fish strike indicator and as such, the name of the tip-up, that was struck by a fish. Fields 482 and 484 likewise provide the date and time when the fish struck the tip-up.

The user can also change the pre-populated information contained in fields 480, 482 and 484 by simply tapping on these fields. Tapping on field 480 for example, provides a drop down menu which lists the names of all of the fish strike indicator devices that are currently being monitored by software application 400. The user can then choose from this list of names. Alternatively, the user can also manually enter the name of a non-monitored fish strike indicator or tip-up if the user so chooses. The user can also change the date and time information by simply tapping on each of fields 482 and/or 484 and then manually entering the desired date and time information into these fields.

In addition to the data fields described above, screen 464 also includes two toggle switches 486, 488. Toggle switch 486 allows the user to record whether or not a fish was caught. Toggle switch 488 allows the user to record whether or not he or she kept the fish. Finally, an additional "Comments" field 490 is provided on screen 464 to allow the user to enter and record comments concerning the fish strike and the fish that struck. Once the user has selected the appropriate toggle switch positions and entered any desired comments into field 490, the user can either tap "Save" button 492 to save the information or tap "Cancel" button 494 to cancel the choices and information entered by the user on screen 464. Tapping either of these buttons returns the user to main "Fish Log" screen 450 (see FIG. 30).

Upon reaching "Basic" screen 464, and instead of entering information into the various fields on this screen, the user can instead navigate to one of the other "Fish Log" screens 466, 468, or 470 by tapping on one of the navigation icons 474, 476 or 478 respectively which are located at the bottom of screen 464. For example, tapping on "Fish" navigation icon 474 takes the user to screen 466 as shown in FIG. 34. Screen 466 allows the user to enter and store detailed information about each fish that is actually caught. More specifically, fields are provided on screen 466 to allow the user to enter and record the fish species (field 496), the length of the fish (field 498), the weight of the fish (field 500) and the bait used to catch the fish (field 502).

In addition, a field 504 is provided to allow the user to display and save a photograph of the caught fish. To do so, the user simply taps on field 504. The user then has a choice to either select a photograph from already existing photographs stored in memory on the smart phone or to take a new photograph of the fish using the built-in camera of the smart phone. The chosen or newly taken photograph is then automatically displayed in field 504 of screen 466.

Again, once all of the information has been entered into the appropriate fields on screen 466, the user can either tap "Save" button 492 to save the information or tap "Cancel" button 494 to cancel the information entered by the user on screen 466. Tapping either of these buttons returns the user to main "Fish Log" screen 450 (see FIG. 30).

Tapping "Weather" navigation icon 476 at the bottom of "Basic" screen 464 takes the user to screen 468 as shown in FIG. 35. Screen 468 allows the user to enter and store detailed information about the weather conditions that existed at the time that a fish strike occurred. More specifically, fields are provided on screen 468 to allow the user to enter and record information relating to temperature (field 506), wind (field 508), and other weather related conditions (field 510). Once all of the information has been entered into the appropriate fields on screen 468, the user can either tap "Save" button 492 to save the information or tap "Cancel" button 494 to cancel the information entered by the user on screen 468. Tapping either of these buttons returns the user to main "Fish Log" screen 450.

It should be noted that in the embodiment of the present invention shown in the figures, weather related data is manually entered by the user into the fields on screen 468. In alternative embodiments of the present invention, however, weather related data is automatically supplied to software application 400 and is automatically populated into the fields on screen 468. In these alternative embodiments, weather related data is supplied to software application 400 from sensors on the fish strike indicator or on the tip-up, or is provided from a third party source such as, for example a weather reporting or weather news service.

Finally, tapping "Share" navigation icon 478 at the bottom of "Basic" screen 464 takes the user to screen 470 as shown in FIG. 36. Screen 470 allows the user to post information, such as information relating to fish that have been caught or information relating to the user's overall fishing experience, to various Internet sites such as, for example social media sites such as Facebook. To accomplish this, screen 470 contains a field 512 in which the user enters the text of a message to be posted. Screen 470 also allows the user to attach a photograph along with the message to be posted.

Once the user has completed composing the message and has attached any desired photographs, the user simply taps on "Share" icon button 514 located in the upper right-hand corner of screen 470. Tapping on this button automatically posts the message and if attached, any photographs, to the user's Facebook page in this embodiment. Tapping on button 514 also returns the user back to main "Fish Log" screen 450.

It should be understood that the present invention is not limited to posting messages to only Facebook and in other embodiments of the present invention, software application 400 permits users to post messages to other Internet and social media sites.

Returning our attention back to main "Fish Log" screen 450 (see FIG. 30), it can be seen that this screen includes two additional buttons 516 and 518. "Plus sign" button 516 allows a user to manually add fish strike entries to table 452 relating to fish strikes that were inadvertently missed or that occurred at non-monitored fish strike indicators or tip-ups. To do this, the user simply taps on button 516 which takes the user to screen 520 shown in FIG. 37.

Screen 520 is identical to "Basic" screen 464 and information is entered into the fields on screen 520 in the same manner as information is manually entered into the fields on screen 464. For example, tapping on field 522 provides a drop down menu which lists the names of all of the fish strike indicator devices that are currently being monitored by software application 400 along with an "add manual tip-up" choice 524. The user can then choose from this list of names. Alternatively, the user can choose the "add manual tip-up" choice 524 and manually enter the name of a non-monitored fish strike indicator or tip-up if the user so chooses.

Once the user has completed entering the desired information into the fields on screen 520, the user can either tap "Save" button 526 to save the information or tap "Cancel" button 528 to cancel the information entered by the user on screen 520. Tapping either of these buttons returns the user to main "Fish Log" screen 450 where an entry containing the name that was entered into field 522 on screen 520 now appears in table 452.

Finally, when the user has completed reviewing and/or making changes in the "Fish Log" section of software application 400, the user simply taps on "Back" button 518 located in the upper left-hand corner of main screen 450 (see FIG. 30) and the user is returned to home screen 402.

Returning back to home screen 402, it can be seen that the user also has the ability to enter the "Settings" section of software application 400 from this screen. To do so, the user simply taps on "Settings" navigation icon 414 (see FIG. 25) which takes the user to screen 530 shown in FIG. 38. Screen 530 in this embodiment allows the user to select the type of notification tone that a user will hear when a strike occurs at a fish strike indicator device being monitored by software application 400. In this embodiment, the user can choose one of seven different tones listed in table 532 by simply tapping on the name of the desired tone listed in the table. Upon selecting the desired tone by tapping on its name, the user is automatically returned back to home page 402 in this embodiment.

Figure 39:
FIG. 39 shows a screen shot of a "Fish on!" alert screen which is displayed and used as part of the software application of FIG. 25.

FIG. 39 shows a "Fish on!" alert screen 534 which alerts the user to the fact that there has been a strike at a tip-up containing a monitored fish strike indicator device and that as a result, the fish strike indicator device has been activated. The appearance of screen 534 on the smart phone is accompanied by the chosen notification tone selected by the user under the "Settings" section of software program 400. Alert screen 534 provides the user with the name 536 of the fish strike indicator at which the strike occurred along with two buttons 538 and 540.

Tapping on button 538 takes the user to main "Fish Log" screen 450 where the user can choose the recent fish strike from table 452 and can then review and enter data into the "Fish Log" section of software application 400 relating to the fish strike. Alternatively, if the user does not want to review or enter data into the "Fish Log" section for the recent fish strike at that time, the user can tap on button 540 and be taken back to home page 402. The user can always access the "Fish Log" section of software application 400 at a later date to review and enter data relating to the recent fish strike.

Users also have the ability to enter a message into field 542 on screen 534 and then post the entered message to an Internet web site such as, for example, Facebook in the embodiment of the present invention shown in FIG. 39. Posting is accomplished by tapping on icon 544 on screen 534 in this embodiment.

Numerous modifications may be made to the present invention which still fall within the intended scope hereof. Thus, it should be apparent that there has been provided in accordance with the present invention, an apparatus, system and method for providing an indication or notification to a fishermen when a fish strikes an ice fishing tip-up that fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that may fall within the spirit and broad scope of any appended claims.

The invention claimed is:

1. A fish strike indicating apparatus comprising:
    an enclosure configured to attach to an ice fishing tip-up flagpole, the enclosure comprising
    a cylindrical mounting channel extending longitudinally along a first side of the enclosure, the cylindrical mounting channel adapted to securely receive the flagpole;
    a transmitting apparatus disposed inside of the enclosure, wherein the transmitting apparatus is configured to transmit a wireless signal indicative of a fish strike to a mobile device; and
    a receiving apparatus disposed inside of the enclosure, wherein the receiving apparatus is configured to receive a wireless signal from the mobile device.

2. The fish strike indicating apparatus of claim 1 wherein the fish strike indicating apparatus is configured to transmit data to the mobile device selected from the group consisting of temperature data, fish count data, battery life data, and data identifying the fish strike indicating apparatus.

3. The fish strike indicating apparatus of claim 1 wherein the fish strike indicating apparatus is configured to transmit data to the mobile device indicative of the number of fish strikes that have occurred at the ice fishing tip-up.

4. The fish strike indicating apparatus of claim 1 wherein the fish strike indicating apparatus is configured to transmit information to the mobile device identifying the fish strike indicating apparatus.

5. The fish strike indicating apparatus of claim 1 wherein the fish strike indicating apparatus is configured to transmit the fish strike indicating signal at a first rate of transmission immediately after a fish strike and then, after a predetermined period of time following the fish strike, the fish strike indicating apparatus is configured to transmit the fish strike indicating signal at a second rate of transmission different from the first rate of transmission.

6. The fish strike indicating apparatus of claim 1 further including memory, wherein the fish strike indicating apparatus is configured to store personal information pertaining to a user in the memory.

7. The fish strike indicating apparatus of claim 6 wherein the fish strike indicating apparatus is configured to receive the personal information from the mobile device.

8. The fish strike indicating apparatus of claim 1 wherein the apparatus comprises
    a second mounting channel extending longitudinally along the first side of the enclosure, the second mounting channel having a diameter that is greater than the diameter of the cylindrical mounting channel.

9. The fish strike indicating apparatus of claim 8 wherein the second mounting channel is located between a pair of mounting fingers.

10. The fish strike indicating apparatus of claim 9 wherein the second mounting channel is disposed adjacent to and parallel with the cylindrical mounting channel and between mounting the pair of mounting fingers.

11. The fish strike indicating apparatus of claim 1 further comprising:
    a light source;
    a light source cover directly attached to an end of the enclosure, wherein the light source is disposed inside of the light source cover; and
    a reflecting member disposed inside of the light source cover directly above the light source.

12. The fish strike indicating apparatus of claim 11 wherein the reflecting member is a frustoconical shaped reflecting member.

13. The fish strike indicating apparatus of claim 1 further comprising a temperature sensor.

14. The fish strike indicating apparatus of claim 1 wherein the cylindrical mounting channel comprises
    a first pair of complimentary curved channel side wall members; and
    a second pair of complimentary curved channel side wall members.

15. The fish strike indicating apparatus of claim 14 wherein the first pair of complimentary curved channel side wall members is spaced apart from the second pair of complimentary curved channel side wall members, along the first side of the housing.

16. The fish strike indicating apparatus of claim 15 wherein the enclosure comprises a front housing cover and a rear housing cover;
    one of the first pair of curved channel sidewall members and one of the second pair of curved channel sidewall members are disposed along a longitudinal side edge of the front housing cover; and
    the other of the first pair of complimentary curved channel side wall members and the other of the second pair of complimentary curved channel side wall members are disposed along a longitudinal side edge of the rear housing cover.

17. A system for providing a notification when a fish strikes an ice fishing tip-up, the system comprising:
    a first apparatus configured to attach to an ice fishing tip-up flagpole, wherein the first apparatus is configured to transmit a wireless signal indicative of a fish strike, the first apparatus comprising
    an enclosure, the enclosure comprising a cylindrical mounting channel extending longitudinally along a first side of the enclosure, the cylindrical mounting channel adapted to securely receive the flagpole; and
    an application configured to operatively run on a mobile device, wherein the application is configured to receive the fish strike indicating signal from the first apparatus.

18. The system of claim 17 wherein the first apparatus is configured to receive a wireless signal transmitted from the mobile device.

19. The system of claim 17 wherein the application is configured to receive a plurality of fish strike indicating signals from a plurality of apparatuses, each of the plurality of apparatuses attached to a different ice fishing tip-up, wherein each of the plurality of apparatuses transmits one of the plurality of fish strike indicating signals, and further wherein the application is configured to provide a user of the application with notifications of fish strikes corresponding to only a selected group of the plurality of fish strike indicating signals.

20. The system of claim 17 wherein the application is configured to receive a plurality of fish strike indicating signals from a plurality of apparatuses, each of the plurality of apparatuses attached to a different ice fishing tip-up, wherein each of the plurality of apparatuses transmits one of the plurality of fish strike indicating signals, and further wherein the application is configured to provide an identifier for each of the plurality of apparatuses.

21. The system of claim 17 further comprising a second apparatus remotely located from both the first apparatus and the mobile device, wherein the second apparatus is configured to receive the fish strike indicating signal from the first apparatus, and further wherein the second apparatus is configured to boost and re-transmit the fish strike indicating signal for receipt by the application.

22. The system of claim 17 wherein the first apparatus is configured such that the rate of transmission of the fish strike indicating signal is slowed after a set period of time following the fish strike.

23. The system of claim 17 wherein the first apparatus is configured to transmit information indicative of a temperature at the time of the fish strike.

* * * * *